US005776993A

United States Patent [19]
Shin et al.

[11] Patent Number: 5,776,993
[45] Date of Patent: Jul. 7, 1998

[54] THERMOPLASTIC PVC FOAM COMPOSITION

[75] Inventors: Bong Sub Shin; Jae Yeon Lee; Dong Keun Kim; Seoun Jun Kim; Sung Ok Cho, all of Pusan, Rep. of Korea

[73] Assignees: Korea Institute of Footwear & Leather Technology; HS Corporation, both of Pusan, Rep. of Korea

[21] Appl. No.: 697,948

[22] Filed: Sep. 3, 1996

[30] Foreign Application Priority Data

Mar. 12, 1996 [KR] Rep. of Korea ............... 96-6444

[51] Int. Cl.$^6$ ............................................. C08J 9/00
[52] U.S. Cl. ..................... 521/140; 521/75; 521/134; 521/137; 521/139; 521/140
[58] Field of Search ................. 521/145, 137, 521/134, 139, 140, 75

[56] References Cited

U.S. PATENT DOCUMENTS

| | | | |
|---|---|---|---|
| 2,901,774 | 9/1959 | Pooley | 521/75 |
| 3,632,533 | 1/1972 | Winkler | 521/75 |
| 3,695,477 | 10/1972 | Edmonson et al. | 521/75 |
| 3,708,441 | 1/1973 | Joslyn et al. | 521/137 |
| 3,944,508 | 3/1976 | Barth et al. | 521/134 |
| 4,228,245 | 10/1980 | Morgan et al. | 521/75 |
| 4,245,055 | 1/1981 | Smith | 521/140 |
| 4,454,250 | 6/1984 | Florence et al. | 521/75 |
| 4,956,222 | 9/1990 | Matsuura et al. | 521/134 |

FOREIGN PATENT DOCUMENTS

| | | |
|---|---|---|
| 3-114740 | 5/1991 | European Pat. Off. . |
| 0 409 992 | 1/1991 | Japan . |

*Primary Examiner*—Morton Foelak
*Attorney, Agent, or Firm*—Finnegan, Henderson, Farabow, Garrett & Dunner, L.L.P.

[57] ABSTRACT

This invention relates to a thermoplastic PVC foam composition and more particularly, to the thermoplastic PVC foam composition suitable for a shoe material, which is characterized by the following fabrication and advantages. Some plasticizer and additive are added to the PVC base, plasticized by dioctyl phthalate (hereinafter called as "DOP") or epoxide soybean oil (hereinafter called as "ESO") to obtain the thermoplastic PVC foam composition. Then, one type of compound, selected from rubber thermoplastic urethane compound (hereinafter called as "TPU") and ethylenevinyl acetate copolymer (hereinafter called as "EVA"), was added to the mixture for modification. The desired product, so formed, has recognized some advantages in that a) possible foaming by extruder and injector including heating press, b) the composition, so foamed, can be regenerated, c) the desired product is light due to its low specific gravity, and d) physical property, anti-slip, abrasion-resistance and adhesiveness with other materials are remarkable.

13 Claims, No Drawings

THERMOPLASTIC PVC FOAM COMPOSITION

BACKGROUND OF THE INVENTION

1. Field of the Invention

This invention relates to a thermoplastic PVC foam composition and more particularly, to the thermoplastic PVC foam composition suitable for a shoe material, which is characterized by the following fabrication and advantages thereto:

Some plasticizer and additive are added to the PVC base, plasticized by dioctyl phthalate (hereinafter called as "DOP") or epoxide soybean oil (hereinafter called as "ESO") to obtain the thermoplastic PVC foam composition. Then, one type of compound, selected from rubber, thermoplastic urethane compound (hereinafter called as "TPU") and ethylene-vinyl acetate copolymer (hereinafter called as "EVA"), was added to said mixture for modification. The desired product, so formed, has recognized some advantages in that a) possible foaming by extruder and injector including heating press, b) the composition, so foamed, can be regenerated, c) the desired product is light due to its low specific gravity, and d) physical property, anti-slip, abrasion-resistance and adhesiveness with other materials are remarkable.

2. Description of the Prior Art

Vulcanized rubber, which has been commonly used as a shoe material hitherto, has recognized some advantages in terms of its mechanical property, abrasion-resistance and anti-chemicals.

Nonetheless, its fabrication and molding processes are quite complicated and in case of crosslinking, some covalent bonds are formed by the molecular chains, thus preventing the regeneration. In this respect, the need for a new elastomer with superior fabrication and molding property to the existing materials, as well as possible regeneration, has been on the rapid increase.

To cope with this situation, a method of applying PVC to a shoe material has been disclosed in unexamined publication of Japanese Patent No. Pyung 2-140246 and Pyung 3-114740. However, the material, so prepared as aforementioned, has some disadvantages in that a) it is easily slipped due to the strong plastic property at room temperature, and b) the commercial application proved to be unavailable due to its poor adhesiveness with other materials. On top of that, another method of using stylene-butadiene copolymer in a single manner or said substance as a base, designed for its shoe application, has been also disclosed in Japanese Patent No. 50082-162 but said method proved to be uneconomical due to its poor adhesiveness and low abrasion-resistance.

Therefore, the inventor has endeavored to develop a rubber-substitution material having a remarkable physical properties and possible melt by heat, while the appearance and anti-slip property is similar to the rubbe, and finally, succeeded in preparing a modified thermoplastic PVC foam composition by adding one kind of modifier selected from natural or synthetic rubber, TPU and EVA to the PVC base.

SUMMARY OF THE INVENTION

The primary object of this invention is to provide a thermoplastic PVC foam composition suitable for a shoe material, with the following advantages: a) physical properties—modulus of elasticity, tensile strength and tear strength—are remarkable, b) specific gravity is low, c) foam-molding is available, and d) man-made leather and melt adhesive strength are remarkable.

The present invention relates to the thermoplastic PVC foam composition comprising PVC base, plasticizers and other additives characterized in which one or more modifiers of 10 or 90 part by weight selected from the group of rubber, thermoplastic urethane compound and ethylene-vinyl acetate copolymer, is added to said PVC base of 100 part by weight for modification thereof.

The present invention also relates to the thermoplastic PVC foam composition, wherein the PVC of 0.5 to 40 part by weight, graft-polymerized by acrylonitrile (hereinafter called as AN), a compatible agent, is added in proportion to said PVC base of 100 part by weight.

Further, said PVC base is characterized by mixing the PVC in suspended/emulsified polymerization types by the mixing ratio of 99.5:0.5 to 0.5:99.5 part by weight, respectively.

DETAILED DESCRIPTION OF THIS INVENTION

The present invention is described in more detail as set forth hereunder.

This invention relates to a substitution material of vulcanized rubber having remarkable physical properties by adding one modifier, selected from rubber, TPU and EVA, to the PVC resin mixed with some additives such as vesicant, stabilizer, etc.

The polymerization degree of said PVC base of this invention is in the range of 600 to 2,700 and said PVC base is prepared for use by mixing the PVC in the emulsified/suspended polymerization in a ratio of 99.5:0.5 to 0.5:99.5 part by weight, preferably by the ratio of 80:20 to 20:80 part by weight.

In general, if the polymerization degree of PVC is less than 600, the fluidity is remarkable but its abrasion-resistant rate and modulus of elasticity are low. If the polymerization degree of PVC exceeds 2,700, its physical property is remarkable but a low fluidity is responsible for reducing the stability of cell in foaming. Meantime, the PVC in the emulsified polymerization form is superior to that in the suspended polymerization form in terms of thermal stability and cell's stability in foaming. According to this invention, therefore, the PVC is prepared by mixing two types of polymerization base in the emulsified and suspended form.

For the manufacture of thermoplastic PVC foam composition according to this invention, the rubber to sustain the flexibility at low temperature and exhibiting the modulus of elasticity like rubber, may be used as a modifier; for example, one or more mixtures selected from butadiene rubber (hereinafter called as "BR"), stylene-butadiene rubber (hereinafter called as SBR), acrylonitrile-butadiene rubber (hereinafter called as "NBR"), isoprene rubber (hereinafter called as IR) and natural rubber (hereinafter called as "NR"). In particular, the NBR among said rubbers has a good compatibility to PVC and reduces the switch-over of plasticizer. The NBR, a copolymer of both AN and butadiene, demonstrates a variety of properties in accordance with the graft copolymerization rate of AN. The graft copolymerization rate of AN from the commercially available NBR is in the range of 0.5 to 45 mol % and said AN is in the granular form.

As for the NBR used in this invention, if the graft copolymerization rate of AN is less than 0.5 mol %, the switch-over of plasticizer is significantly increased and thus its poor compatibility to PVC may lead to the lowest physical property of the desired product. Furthermore, acrylonitrile exceeds 40 mol % and the grafted NBR shows a poor property at a low temperature.

EVA, another modifier, is effectively used for improving thermal bonding property and melt viscosity related to PVC. Hence, the EVA demonstrates a variety of physical properties in accordance with the graft copolymerization rate of vinylacetate (hereinafter called as VA) and melt flow index (hereinafter called as MI). In case of EVA resin used in this invention, the graft copolymerization rate of VA is in the range of 0.5 to 60 mol % with MI in the range of 0.5 to 450 g/10 mins.

If the graft copolymerization rate of VA is less than 0.5 mol %., some properties—flexibility, elasticity, low-temperature, impact-resistance, adhesiveness and anti-slip—should be reduced.

Further, TPU is very effectively used not only for enhancing the low-temperature property of PVC, but also for increasing the initial modulus of elasticity.

According to this invention, at least one modifier of 1.0 to 90 part by weight, selected from NBR, TPU and EVA, is added to the PVC base of 100 part.

Hence, if said modifier is used with less than 1.0 part by weight, the appearance becomes poor owing to similar movement to strengthened plastic, and in case of exceeding the level of 90 part by weight, the fabrication property becomes poor.

According to this invention, in addition to said modifier, acrylonitrile-grafted PVC suitable for a shoe material may be added as a compatible agent.

Said compatible agent may enhance the compatibility over PVC base which maintains the partial compatibility and a modifier brand, thus promoting the physical property of foam and reducing the melt viscosity of the brand which may in turn enhance the fabrication property. Hence, the compatible agent demonstrates a variety of physical properties in accordance with graft copolymerization rate of AN over PVC. As far as the compatible agent used in this invention is concerned, the graft copolymerization rate of AN is in the range of 0.5 to 45 mol % and preferably, the graft copolymerization rate of AN is in the range of 25 mol % over PVC.

The compatible agent is added in 0.5 to 40 part by weight in proportion to the PVC base of 100 part by weight. If the content of said compatible agent is less than 0.5 part by weight, the physical property is sharply reduced and in case of exceeding the level of 40 part by weight, the coloring of the product becomes turbid with increasing hardness.

In case of a vesicant designed to manufacture the thermoplastic PVC foam of this invention, one organic vesicant or more than two vesicants in adjusted part by weight is/are blended for use.

Their content is 0.1 to 5.0 part by weight in proportion to the desired product of 100 part by weight. If the vesicant containing less than 0.1 part by weight is used, the foaming rate becomes low and in case of exceeding the level of 5.0 part by weight, the shape of product may not be maintained.

Hence, the organic vesicants used in this invention are azodicarbonamide (hereinafter called as "ADCA"), p,p'-oxy (benzenesulfonyl hydrazide [hereinafter called as "OBSH"]), p-toluenesulfonyl hydrazide (hereinafter called as TSH), zinc ditoluenesulfinate (hereinafter called as "TM"), and p-toluenesulfonylsemicarbazide (hereinafter called as "TS").

Among the abovementioned vesicants, the ADCA-type produces large amounts of gas when foamed, and is stable at high temperature but is liable to be discolored due to remaining materials. However, the OBSH-type is foamed at relatively low temperature and its property is remarkable as the first vesicant.

In case of a foaming promoter, zinc oxide (ZnO) or TM of 0.5 to 200 part by weight may be used in proportion to vesicant of 100 part by weight.

Their concurrent use of vesicants has an advantage of modulating the foaming temperature to its use.

As for other additives, the following agents may be used in proportion to the PVC base of 100 part by weight: antioxidant of 0.1 to 3.0 part by weight, UV stabilizer of 0.1 to 2.0 part by weight, coloring agent of 0.1 to 5.0 part by weight, lubricant of 0.1 to 30 part by weight and filler of 0.1 to 100 part by weight. Hence, said lubricant may include macromolecule aromatic compounds, ester compound, or EVA having a high MI. Further, carbon black, calcium carbonate, or silica may be used as a filler.

Based on said composition, the method of manufacturing the thermoplastic PVC foam is described in more detail as set forth hereunder.

The PVC is charged to a mixture device such as super-mixer and with the addition of plasticizer in adjusted part by weight and additive, the mixture is further mixed and plasticized at room temperature for 5 to 10 mins. Then, one modifier, selected from rubber, TPU and EVA, is added to the plasticization-completed resin and followed by continuous mixture for another 5 to 10 mins for the pelletization process using an extruder at an internal temperature of 120° to 170° C. Hence, if the temperature of extruder is less than 120° C., the resin cannot be melted and in case of exceeding the temperature of 170° C., the foaming efficiency of the mixture is reduced.

The mixture, so manufactured from the aforementioned method, is extruded and injected at 160° to 190° C. so that a variety of vesicant products may be fabricated.

As described in the above, the PVC foam manufactured in accordance with this invention may be used as a substitution material of the existing rubber owing to its remarkable physical properties compared with the conventional vulcanized rubbers i.e., abrasion-resistance, anti-slip and adhesiveness. In particular, the PVC foam is very useful as a shoe material.

This invention is explained in more detail by the following examples, but the claims are not limited to these examples.

EXAMPLE 1

The PVC base according to this invention was prepared by blending the PVC of 80 part by weight in the emulsified polymerization form (manufacturer: Hanwha Chemical Co.) having a polymerization degree of 1,000 and the PVC of 20 part by weight in the suspended polymerization form, having the same polymerization degree as above (manufacturer: Hanwha Chemical Co.). The following agents were added to the PVC mixture of 100 part by weight as readjusted as above: a) a co-plasticizer of 100 part by weight, prepared by mixing DOP (manufacturer: Hanwha Chemical Co.) and ESO (manufacturer: Songwon Chemical Co.), b) a co-stabilizer of 2.0 part by weight, prepared by mixing butyl-stearate of 5.0 part by weight (manufacturer: Songwon Chemical Co.) as a lubricant, foaming stabilizer, and antioxidant, and c) a co-vesicant 6.0 part of by weight, prepared by mixing calcium carbonate of 20 part by weight as a filler and three types of vesicant containing the same part by weight (ADCA, OBSH and TSH [manufacturer: Dongjin Hwasung Co.]). The mixture was mixed and plasticized within supermixer for 5 to 10 mins. Then, after the addition of NBR (manufacturer: Goodyear) of 20 part by weight and compatible agent of 10 part by weight to the plasticization-completed resin, the mixture was continuously mixed for 5 to 10 mins until the compounding agent was homogeneously dispersed and pelletized using an extruder at an internal temperature of 120° to 170° C. In case of the compatible agent used in this invention, it was prepared in a reactor by the solution-polymerization process using the PVC in the suspended polymerization form, having the polymerization degree of 1,000 (manufacturer: Hanwha Chemical Co.) and AN (manufacturer: Junsei Co.).

Hence, AN (graft copolymerization rate in proportion to PVC: 25 mol %) was employed.

EXAMPLE 2~4

The desired product was manufactured in the same manner as in Example 1, except the fact that as shown in the following table 1, the PVC base was prepared by blending the PVC in the emulsified polymerization form, having the polymerization degree of 1,000 (manufacturer: Hanwha Chemical Co.) and the PVC in the form of suspended polymerization having the same polymerization degree (Hanwha Chemical Co.), making their mixing ratio different.

EXAMPLE 5~8

The desired product was manufactured in the same manner as in Example 1, except the fact that as shown in the following table 1, the PVC base was prepared by blending the PVC in the emulsified polymerization form, having the polymerization degree of 1,700 (manufacturer: Hanwha Chemical Co.) and the PVC in the suspended polymerization form, having the same polymerization degree (Hanwha Chemical Co.), while making their mixing ratio different.

EXAMPLE 9~12

The desired product was manufactured in the same manner as in Example 1, except the fact that as shown in the following table 1, the PVC base was prepared by blending the PVC in the emulsified polymerization form, having the polymerization degree of 2,500 (manufacturer: Hanwha Chemical Co.) and the PVC in the suspended polymerization form, having the same polymerization degree (Hanwha Chemical Co.), while making their mixing ratio different.

EXAMPLE 13~16

The desired product was manufactured in the same manner as in Example 1, except the fact that as shown in the following table 1, the PVC base was prepared by blending the PVC in the emulsified polymerization form, having the polymerization degree of 1,000 (manufacturer: Hanwha Chemical Co.) and the PVC in the suspended polymerization form having the polymerization degree of 2,500 (Hanwha Chemical Co.), while making their mixing ratio different.

EXAMPLE 17

The PVC base according to this invention was prepared by blending the PVC of 20 part by weight in the emulsified-polymerization form (manufacturer: Hanwha Chemical Co.), having a polymerization degree of 1,000 and the PVC of 80 part by weight in the suspended polymerization form, having the polymerization degree of 2,500 (manufacturer: Hanwha Chemical Co.). The following agents were added to the PVC mixture of 100 part by weight as readjusted as above: a) a co-plasticizer of 90 part by weight, mixing DOP (manufacturer: Hanwha Chemical Co.) and ESO (manufacturer: Songwon Chemical Co.), b) a co-vesicant 6.0 part of by weight, prepared by mixing butyl stearate of 5.0 part by weight (manufacturer: Songwon Chemical Co.) as a lubricant, zinc-type stabilizer of 2.0 part by weight, calcium carbonate of 20 part by weight as a filler and three types of vesicant (ADCA, OBSH and TSH [manufacturer: Dongjin Hwasung Co.]) in a same part by weight. The mixture was mixed and plasticized by an supermixer for 5 to 10 mins. Then, after the addition of NBR (manufacturer: Goodyear) of 20 part by weight and compatible agent of 10 part by weight to the plasticization-completed resin, the mixture was continuously mixed for 5 to 10 mins until the compounding agent was homogeneously dispersed and pelletized using an extruder at an internal temperature of 120° to 170° C.

EXAMPLE 18~23

The desired product was manufactured in the same manner as in Example 17, except for the different composition ratio of plasticizer, as represented in the following table 1.

EXAMPLE 24~29

The desired product was manufactured in the same manner as in Example 17, except for the fact that the addition amount of NBR (manufacturer: Goodyear Co.) as a modifier was different in proportion to PVC base of 100 part by weight, as represented in the following table 1.

EXAMPLE 30~34

The desired product was manufactured in the same manner as in Example 17, except for the fact that the addition amount of TPU (manufacturer: Sunkyong Ind.) as a modifier was different in proportion to PVC base of 100 part by weight, as represented in the following table 1.

EXAMPLE 35~39

The desired product was manufactured in the same manner as in Example 17, except for the fact that the addition amount of EVA (manufacturer: Dongsung Chemical Co.) as a modifier was different in proportion to PVC base of 100 part by weight, as represented in the following table 1. The EVA resin (graft copolymerization rate of vinylacetate: 20 mol %, MI: 20 g/10 mins) was used.

EXAMPLE 40~43

The desired product was manufactured in the same manner as in Example 17, except for the fact that the addition amount of AN base-copolymerized PVC as a compatible agent was different in proportion to PVC base of 100 part by weight, as represented in the following table 1.

In case of the compatible agent used in this invention, it was prepared in a reactor by the solution-polymerization process using the PVC in the suspended polymerization form having the polymerization degree of 1,000 (manufacturer: Hanwha Chemical Co.) and AN (manufacturer: Junsei Co.).

Hence, AN (graft copolymerization rate in proportion to PVC: 25 mol %) was employed.

EXAMPLE 44~47

The desired product was manufactured in the same manner as in Example 17, except for the fact that the addition amount of co-stabilizer containing foaming promoter and antioxidant was different, as represented in the following table 1. In case of the stabilizer used in this invention, foaming promoter zinc oxide (manufacturer: Hanil Chemical Co.), antioxidant (manufacturer: Ciba-Geigy) and UV stabilizer (manufacturer: Ciba-Geigy) were blended in a same ratio for use.

EXAMPLE 48~53

The desired product was manufactured in the same manner as in Example 17, except for the fact that the addition amount of butyl stearate (manufacturer: Songwon Chemical Co.) as a lubricant was different, as represented in the following table 1.

EXAMPLE 54~59

The desired product was manufactured in the same manner as in Example 17, except for the fact that the addition amount of vesicant was different, as represented in the following table 1. In case of the vesicant used in this invention, three types of vesicant (ADCA, OBSH and TSH [manufacturer: Dongjin Hwasung Co.]) were used in a same part by weight for use.

EXAMPLE 60~65

The desired product was manufactured in the same manner as in Example 17, except for the fact that the addition amount of calcium carbonate (manufacturer: Songwon Chemical Co.) as a filler was different, as represented in the following table 1.

TABLE 1

| Example | Base | | | | | | Co-plasticizer[7] | Compatible agent[8] | Modifier | | | Additive | | | |
|---|---|---|---|---|---|---|---|---|---|---|---|---|---|---|---|
| | S1[1] | S2[2] | S3[3] | E1[4] | E2[5] | E3[6] | | | Rubber[9] | TPU[10] | EVA[11] | Co-stabilizer[12] | Lubricant[13] | Co-foaming agent[14] | Filler[15] |
| 1 | 80 | — | — | 20 | — | — | 100 | 10 | 20 | — | — | 2.0 | 5.0 | 6.0 | 20 |
| 2 | 60 | — | — | 40 | — | — | 100 | 10 | 20 | — | — | 2.0 | 5.0 | 6.0 | 20 |
| 3 | 40 | — | — | 60 | — | — | 100 | 10 | 20 | — | — | 2.0 | 5.0 | 6.0 | 20 |
| 4 | 20 | — | — | 80 | — | — | 100 | 10 | 20 | — | — | 2.0 | 5.0 | 6.0 | 20 |
| 5 | — | 80 | — | — | 20 | — | 100 | 10 | 20 | — | — | 2.0 | 5.0 | 6.0 | 20 |
| 6 | — | 60 | — | — | 40 | — | 100 | 10 | 20 | — | — | 2.0 | 5.0 | 6.0 | 20 |
| 7 | — | 40 | — | — | 60 | — | 100 | 10 | 20 | — | — | 2.0 | 5.0 | 6.0 | 20 |
| 8 | — | 20 | — | — | 80 | — | 100 | 10 | 20 | — | — | 2.0 | 5.0 | 6.0 | 20 |
| 9 | — | — | 80 | — | — | 20 | 100 | 10 | 20 | — | — | 2.0 | 5.0 | 6.0 | 20 |
| 10 | — | — | 60 | — | — | 40 | 100 | 10 | 20 | — | — | 2.0 | 5.0 | 6.0 | 20 |
| 11 | — | — | 40 | — | — | 60 | 100 | 10 | 20 | — | — | 2.0 | 5.0 | 6.0 | 20 |
| 12 | — | — | 20 | — | — | 80 | 100 | 10 | 20 | — | — | 2.0 | 5.0 | 6.0 | 20 |
| 13 | 80 | — | — | — | — | 20 | 100 | 10 | 20 | — | — | 2.0 | 5.0 | 6.0 | 20 |
| 14 | 60 | — | — | — | — | 40 | 100 | 10 | 20 | — | — | 2.0 | 5.0 | 6.0 | 20 |
| 15 | 40 | — | — | — | — | 60 | 100 | 10 | 20 | — | — | 2.0 | 5.0 | 6.0 | 20 |
| 16 | 20 | — | — | — | — | 80 | 100 | 10 | 20 | — | — | 2.0 | 5.0 | 6.0 | 20 |
| 17 | 20 | — | — | — | — | 80 | 90 | 10 | 20 | — | — | 2.0 | 5.0 | 6.0 | 20 |
| 18 | 20 | — | — | — | — | 80 | 80 | 10 | 20 | — | — | 2.0 | 5.0 | 6.0 | 20 |
| 19 | 20 | — | — | — | — | 80 | 70 | 10 | 20 | — | — | 2.0 | 5.0 | 6.0 | 20 |
| 20 | 20 | — | — | — | — | 80 | 60 | 10 | 20 | — | — | 2.0 | 5.0 | 6.0 | 20 |
| 21 | 20 | — | — | — | — | 80 | 50 | 10 | 20 | — | — | 2.0 | 5.0 | 6.0 | 20 |
| 22 | 20 | — | — | — | — | 80 | 40 | 10 | 20 | — | — | 2.0 | 5.0 | 6.0 | 20 |
| 23 | 20 | — | — | — | — | 80 | 30 | 10 | 20 | — | — | 2.0 | 5.0 | 6.0 | 20 |
| 24 | 20 | — | — | — | — | 80 | 80 | 10 | 1.0 | — | — | 2.0 | 5.0 | 6.0 | 20 |
| 25 | 20 | — | — | — | — | 80 | 80 | 10 | 5.0 | — | — | 2.0 | 5.0 | 6.0 | 20 |
| 26 | 20 | — | — | — | — | 80 | 80 | 10 | 10 | — | — | 2.0 | 5.0 | 6.0 | 20 |
| 27 | 20 | — | — | — | — | 80 | 80 | 10 | 20 | — | — | 2.0 | 5.0 | 6.0 | 20 |
| 28 | 20 | — | — | — | — | 80 | 80 | 10 | 30 | — | — | 2.0 | 5.0 | 6.0 | 20 |
| 29 | 20 | — | — | — | — | 80 | 80 | 10 | 40 | — | — | 2.0 | 5.0 | 6.0 | 20 |
| 30 | 20 | — | — | — | — | 80 | 80 | 10 | — | 5.0 | — | 2.0 | 5.0 | 6.0 | 20 |
| 31 | 20 | — | — | — | — | 80 | 80 | 10 | — | 10 | — | 2.0 | 5.0 | 6.0 | 20 |
| 32 | 20 | — | — | — | — | 80 | 80 | 10 | — | 20 | — | 2.0 | 5.0 | 6.0 | 20 |
| 33 | 20 | — | — | — | — | 80 | 80 | 10 | — | 30 | — | 2.0 | 5.0 | 6.0 | 20 |
| 34 | 20 | — | — | — | — | 80 | 80 | 10 | — | 40 | — | 2.0 | 5.0 | 6.0 | 20 |
| 35 | 20 | — | — | — | — | 80 | 80 | 10 | — | — | 5.0 | 2.0 | 5.0 | 6.0 | 20 |
| 36 | 20 | — | — | — | — | 80 | 80 | 10 | — | — | 10 | 2.0 | 5.0 | 6.0 | 20 |
| 37 | 20 | — | — | — | — | 80 | 80 | 10 | — | — | 20 | 2.0 | 5.0 | 6.0 | 20 |
| 38 | 20 | — | — | — | — | 80 | 80 | 10 | — | — | 30 | 2.0 | 5.0 | 6.0 | 20 |
| 39 | 20 | — | — | — | — | 80 | 80 | 10 | — | — | 40 | 2.0 | 5.0 | 6.0 | 20 |
| 40 | 20 | — | — | — | — | 80 | 80 | 5.0 | 20 | — | — | 2.0 | 5.0 | 6.0 | 20 |
| 41 | 20 | — | — | — | — | 80 | 80 | 5.0 | 20 | — | — | 2.0 | 5.0 | 6.0 | 20 |
| 42 | 20 | — | — | — | — | 80 | 80 | 15 | 20 | — | — | 2.0 | 5.0 | 6.0 | 20 |
| 43 | 20 | — | — | — | — | 80 | 80 | 20 | 20 | — | — | 0.1 | 5.0 | 6.0 | 20 |
| 44 | 20 | — | — | — | — | 80 | 80 | 10 | 20 | — | — | 0.5 | 5.0 | 6.0 | 20 |
| 45 | 20 | — | — | — | — | 80 | 80 | 10 | 20 | — | — | 1.0 | 5.0 | 6.0 | 20 |
| 46 | 20 | — | — | — | — | 80 | 80 | 10 | 20 | — | — | 3.0 | 5.0 | 6.0 | 20 |
| 47 | 20 | — | — | — | — | 80 | 80 | 10 | 20 | — | — | 4.0 | 5.0 | 6.0 | 20 |
| 48 | 20 | — | — | — | — | 80 | 80 | 10 | 20 | — | — | 2.0 | 0.1 | 6.0 | 20 |

TABLE 1-continued

| Example | Base | | | | | | Co-plasticizer[7] | Compatible agent[8] | Modifier | | | Additive | | | |
|---|---|---|---|---|---|---|---|---|---|---|---|---|---|---|---|
| | S1[1] | S2[2] | S3[3] | E1[4] | E2[5] | E3[6] | | | Rubber[9] | TPU[10] | EVA[11] | Co-stabilizer[12] | Lubricant[13] | Co-foaming agent[14] | Filler[15] |
| 49 | 20 | — | — | — | — | 80 | 80 | 10 | 20 | — | — | 2.0 | 1.0 | 6.0 | 20 |
| 50 | 20 | — | — | — | — | 80 | 80 | 10 | 20 | — | — | 2.0 | 2.0 | 6.0 | 20 |
| 51 | 20 | — | — | — | — | 80 | 80 | 10 | 20 | — | — | 2.0 | 4.0 | 6.0 | 20 |
| 52 | 20 | — | — | — | — | 80 | 80 | 10 | 20 | — | — | 2.0 | 6.0 | 6.0 | 20 |
| 53 | 20 | — | — | — | — | 80 | 80 | 10 | 20 | — | — | 2.0 | 8.0 | 6.0 | 20 |
| 54 | 20 | — | — | — | — | 80 | 80 | 10 | 20 | — | — | 2.0 | 5.0 | 0.5 | 20 |
| 55 | 20 | — | — | — | — | 80 | 80 | 10 | 20 | — | — | 2.0 | 5.0 | 1.0 | 20 |
| 56 | 20 | — | — | — | — | 80 | 80 | 10 | 20 | — | — | 2.0 | 5.0 | 2.0 | 20 |
| 57 | 20 | — | — | — | — | 80 | 80 | 10 | 20 | — | — | 2.0 | 5.0 | 4.0 | 20 |
| 58 | 20 | — | — | — | — | 80 | 80 | 10 | 20 | — | — | 2.0 | 5.0 | 8.0 | 20 |
| 59 | 20 | — | — | — | — | 80 | 80 | 10 | 20 | — | — | 2.0 | 5.0 | 10.0 | 20 |
| 60 | 20 | — | — | — | — | 80 | 80 | 5.0 | 20 | — | — | 2.0 | 5.0 | 6.0 | 1.0 |
| 61 | 20 | — | — | — | — | 80 | 80 | 10 | 20 | — | — | 2.0 | 5.0 | 6.0 | 5 |
| 62 | 20 | — | — | — | — | 80 | 80 | 10 | 20 | — | — | 2.0 | 5.0 | 6.0 | 10 |
| 63 | 20 | — | — | — | — | 80 | 80 | 10 | 20 | — | — | 2.0 | 5.0 | 6.0 | 30 |
| 64 | 20 | — | — | — | — | 80 | 80 | 10 | 20 | — | — | 2.0 | 5.0 | 6.0 | 40 |
| 65 | 20 | — | — | — | — | 80 | 80 | 10 | 20 | — | — | 2.0 | 5.0 | 6.0 | 50 |

COMPARATIVE EXAMPLE 1

The following agents were added to the PVC of 100 part by weight in the emulsified polymerization form, having the polymerization degree of 1,000 (manufacturer: Hanwha Chemical Co.): a) a co-plasticizer of 100 part by weight, prepared by mixing DOP (manufacturer: Hanwha Chemical Co.) and ESO (manufacturer: Songwon Chemical Co.), b) a co-stabilizer of 2.0 part by weight, prepared by mixing butyl-stearate of 5.0 part by weight (manufacturer: Songwon Chemical Co.) as a lubricant, foaming stabilizer, and antioxidant, and c) a co-vesicant 6.0 part of by weight, prepared by mixing calcium carbonate of 20 part by weight as a filler and three types of vesicant containing the same part by weight (ADCA, OBSH and TSH [manufacturer: Dongjin Hwasung Co.]). The mixture was mixed and plasticized within supermixer for 5 to 10 mins. Then, after the addition of NBR (manufacturer: Goodyear) of 20 part by weight and compatible agent of 10 part by weight to the plasticization-completed resin, the mixture was continuously mixed for 5 to 10 mins until the compounding agent was homogeneously dispersed and pelletized using an extruder at an internal temperature of 120° to 170° C. In case of the compatible agent used in this invention, it was prepared in a reactor by the solution-polymerization process using the PVC in the suspended polymerization form having the polymerization degree of 1,000 (manufacturer: Hanwha Chemical Co.) and AN (manufacturer: Junsei Co.).

Hence, AN (graft copolymerization rate in proportion to PVC: 25 mol %) was employed.

COMPARATIVE EXAMPLE 2-3

The desired product was manufactured in the same manner as in Comparison 1, except the fact that the PVC in the suspended polymerization form (manufacturer: Hanwha Chemical Co.) having the different polymerization degrees, as represented in the table 2.

COMPARATIVE EXAMPLE 4-6

The desired product was manufactured in the same manner as in Comparison 1, except the fact that the PVC in the emulsified polymerization form (manufacturer: Hanwha Chemical Co.) having the different polymerization degrees, as represented in the table 2.

COMPARATIVE EXAMPLE 7-12

The desired product was manufactured in the same manner as in Comparison 1, except the fact that any modifier was not added, as represented in the table 2.

COMPARATIVE EXAMPLE 13-14

The desired product was manufactured in the same manner as in Comparison 1, except the fact that as represented in the table 2, the PVC base was prepared by blending the PVC of 20 part by weight in the emulsified polymerization form, having the polymerization degree of 1,000 (manufacturer: Hanwha Chemical Co.) and the PVC of 80 part by weight in the suspended polymerization form, having the polymerization degree of 2,500 (Hanwha Chemical Co.), while adding no modifier.

COMPARATIVE EXAMPLE 15

The desired product was manufactured in the same manner as in Comparison 1, except the fact that any compatible agent was not added, as represented in the table 2.

COMPARATIVE EXAMPLE 16

The desired product was manufactured in the same manner as in Comparison 1, except the fact that any lubricant was not added, as represented in the table 2.

COMPARATIVE EXAMPLE 17-19

Then desired product was manufactured in the same manner as in Comparison 1, except the fact that any the contents of co-vesicant were changed.

TABLE 2

| Exam-ple | Base S1[1] | S2[2] | S3[3] | E1[4] | E2[5] | E3[6] | Co-plasticizer[7] | Compatible agent[8] | Modifier Rubber[9] | TPU[10] | EVA[11] | Additive Co-stabilizer[12] | Lubricant[13] | Co-foaming agent[14] | Filler[15] |
|---|---|---|---|---|---|---|---|---|---|---|---|---|---|---|---|
| 1 | 100 | — | — | — | — | — | 100 | 10 | 20 | — | — | 2.0 | 5.0 | 6.0 | 20 |
| 2 | — | 100 | — | — | — | — | 100 | 10 | 20 | — | — | 2.0 | 5.0 | 6.0 | 20 |
| 3 | — | — | 100 | — | — | — | 100 | 10 | 20 | — | — | 2.0 | 5.0 | 6.0 | 20 |
| 4 | — | — | — | 100 | — | — | 100 | 10 | 20 | — | — | 2.0 | 5.0 | 6.0 | 20 |
| 5 | — | — | — | — | 100 | — | 100 | 10 | 20 | — | — | 2.0 | 5.0 | 6.0 | 20 |
| 6 | — | — | — | — | — | 100 | 100 | 10 | 20 | — | — | 2.0 | 5.0 | 6.0 | 20 |
| 7 | 100 | — | — | — | — | — | 100 | 10 | — | — | — | 2.0 | 5.0 | 6.0 | 20 |
| 8 | — | 100 | — | — | — | — | 100 | 10 | — | — | — | 2.0 | 5.0 | 6.0 | 20 |
| 9 | — | — | 100 | — | — | — | 100 | 10 | — | — | — | 2.0 | 5.0 | 6.0 | 20 |
| 10 | — | — | — | 100 | — | — | 100 | 10 | — | — | — | 2.0 | 5.0 | 6.0 | 20 |
| 11 | — | — | — | — | 100 | — | 100 | 10 | — | — | — | 2.0 | 5.0 | 6.0 | 20 |
| 12 | — | — | — | — | — | 100 | 100 | 10 | — | — | — | 2.0 | 5.0 | 6.0 | 20 |
| 13 | 20 | — | — | — | — | 80 | 100 | 10 | — | — | — | 2.0 | 5.0 | 6.0 | 20 |
| 14 | 20 | — | — | — | — | 80 | 100 | 10 | — | — | — | 2.0 | 5.0 | 6.0 | 20 |
| 15 | 20 | — | — | — | — | 80 | 100 | — | 20 | — | — | 2.0 | 5.0 | 6.0 | 20 |
| 16 | 20 | — | — | — | — | 80 | 100 | 10 | 20 | — | — | 2.0 | — | 6.0 | 20 |
| 17 | 20 | — | — | — | — | 80 | 90 | 10 | 20 | — | — | 2.0 | 5.0 | — | 20 |
| 18 | 20 | — | — | — | — | 80 | 80 | 10 | 20 | — | — | 2.0 | 5.0 | 15 | 20 |
| 19 | 20 | — | — | — | — | 80 | 70 | 10 | 20 | — | — | 2.0 | 5.0 | 20 | 20 |

(Note)
[1] PVC in the form of emulsified polymerization with average polymerization degree of 1,000.
[2] PVC in the form of emulsified polymerization with average polymerization degree of 1,700.
[3] PVC in the form of emulsified polymerization with average polymerization degree of 2,500.
[4] PVC in the form of suspended polymerization with average polymerization degree of 1,000.
[5] PVC in the form of suspended polymerization with average polymerization degree of 1,700.
[6] PVC in the form of suspended polymerization with average polymerization degree of 2,500.
[7] Plasticizer where DOP (dioctyl phthalate) and ESO (epoxided soybean oil) is adjusted by 50:50 part by weight, respectively.
[8] Acrylonitrile-graft PVC (content of acrylonitrile: 25 mol %).
[9] Graft copolymerization rate (acrylonitrile: 30 mol %) and acrylonitrile-butadiene rubber in granular form
[10] Thermoplastic urethane elastomer compound
[11] Graft copolymerization rate of vinyl acetate (20 mol %) and ethylene-vinylacetate copolymer (melt flow index: 20 g/10 mins)
[12] Antioxidant, foaming stabilizer, and mixtuer of UV-stabilizer
[13] Butyl stearate
[14] Vesicant where azodicarbonamide, p,p'-oxy(benzenesulfonyl hydrazide) and p-toluenesulfonyl hydrazide were blended in a certain composition ratio.
[15] Calcium carbonate

EXPERIMENT

In line with the foams manufactured based on said Example 1–65 and Comparison 1–19, the following parameters—tensile strength, tear strength, elongation, abrasion rate, permanent elongation increase, hardness, static frictional coefficient and density—were measured, as represented in the following 3.

Tensile strength measured by a method of ASTM D412;
Tear strength measured by a method of ASTM D624;
Elongation measured by a method of ASTM D412;
Abrasion rate measured by a method of ASTM D 1630;
Permanent elongation increase measured by a method of ASTM D 3574;
Hardness measured by a method of ASTM D2240;
Static frictional coefficient measured by a method of JIS L1095
Density measured by a method of ASTMD 792.

TABLE 1

| | TS (kg/cm$^2$) | TRS (kg/cm) | EL (%) | AR (NBS, %) | PEI (part) | HD (shore A) | SFC (m) | DT (g/cm$^3$) |
|---|---|---|---|---|---|---|---|---|
| Example | | | | | | | | |
| 1 | 60.0 | 35.0 | 365 | 400 | 20 | 55 | 61 | 0.975 |
| 2 | 61.2 | 35.1 | 335 | 410 | 21 | 56 | 60 | 0.985 |
| 3 | 60.1 | 35.3 | 320 | 408 | 22 | 57 | 59 | 0.992 |
| 4 | 62.1 | 37.3 | 315 | 415 | 20 | 56 | 59 | 1.052 |
| 5 | 65.5 | 35.0 | 350 | 570 | 20 | 57 | 57 | 0.954 |
| 6 | 75.3 | 35.1 | 330 | 561 | 23 | 56 | 54 | 0.950 |
| 7 | 72.9 | 35.4 | 317 | 510 | 22 | 56 | 55 | 0.949 |
| 8 | 77.1 | 38.5 | 315 | 540 | 21 | 55 | 56 | 0.947 |
| 9 | 64.1 | 36.0 | 303 | 720 | 22 | 56 | 56 | 0.954 |
| 10 | 66.3 | 36.5 | 302 | 690 | 21 | 58 | 55 | 0.922 |
| 11 | 63.5 | 35.0 | 304 | 660 | 20 | 57 | 55 | 0.899 |
| 12 | 68.7 | 38.1 | 305 | 640 | 20 | 56 | 55 | 0.887 |
| 13 | 60.1 | 38.4 | 412 | 420 | 21 | 55 | 58 | 0.985 |

TABLE 1-continued

| | TS (kg/cm²) | TRS (kg/cm) | EL (%) | AR (NBS, %) | PEI (part) | HD (shore A) | SFC (m) | DT (g/cm³) |
|---|---|---|---|---|---|---|---|---|
| 14 | 62.3 | 41.4 | 325 | 468 | 23 | 56 | 56 | 0.987 |
| 15 | 66.4 | 43.3 | 445 | 489 | 25 | 56 | 55 | 0.988 |
| 16 | 70.5 | 38.5 | 316 | 585 | 20 | 60 | 55 | 0.878 |
| 17 | 80.4 | 45.0 | 300 | 615 | 21 | 57 | 55 | 0.869 |
| 18 | 90.0 | 50.0 | 300 | 786 | 21 | 60 | 55 | 0.860 |
| 19 | 93.1 | 55.5 | 308 | 750 | 22 | 63 | 55 | 0.821 |
| 20 | 96.8 | 58.5 | 305 | 583 | 21 | 67 | 55 | 0.799 |
| 21 | 101.5 | 62.5 | 352 | 582 | 21 | 67 | 52 | 0.901 |
| 22 | 111.5 | 60.1 | 300 | 710 | 22 | 73 | 56 | 0.820 |
| 23 | 120.2 | 62.5 | 310 | 750 | 23 | 81 | 55 | 0.850 |
| 24 | 123.0 | 63.9 | 300 | 1,115 | 21 | 86 | 55 | 0.692 |
| 25 | 89.3 | 48.9 | 358 | 1,076 | 22 | 63 | 52 | 1.006 |
| 26 | 77.1 | 42.1 | 365 | 999 | 21 | 64 | 51 | 0.992 |
| 27 | 76.8 | 43.4 | 302 | 954 | 20 | 65 | 51 | 0.913 |
| 28 | 82.6 | 42.7 | 308 | 842 | 20 | 67 | 51 | 0.966 |
| 29 | 76.4 | 45.7 | 309 | 741 | 20 | 69 | 52 | 1.021 |
| 30 | 69.3 | 41.6 | 310 | 461 | 21 | 71 | 53 | 0.980 |
| 31 | 77.5 | 47.3 | 268 | 1,005 | 21 | 64 | 56 | 0.992 |
| 32 | 77.2 | 44.0 | 310 | 960 | 20 | 66 | 56 | 0.915 |
| 33 | 81.0 | 46.0 | 355 | 830 | 20 | 67 | 55 | 0.964 |
| 34 | 76.8 | 45.9 | 368 | 720 | 22 | 70 | 56 | 1.031 |
| 35 | 69.8 | 42.1 | 307 | 450 | 20 | 72 | 55 | 0.981 |
| 36 | 75.1 | 42.0 | 340 | 750 | 24 | 60 | 50 | 0.993 |
| 37 | 69.8 | 38.5 | 310 | 450 | 25 | 55 | 55 | 0.995 |
| 38 | 60.0 | 43.1 | 310 | 450 | 24 | 56 | 56 | 0.997 |
| 39 | 61.0 | 39.9 | 300 | 400 | 27 | 56 | 55 | 0.101 |
| 40 | 65.2 | 37.3 | 302 | 400 | 26 | 55 | 56 | 1.109 |
| 41 | 80.1 | 41.1 | 340 | 720 | 20 | 66 | 50 | 0.955 |
| 42 | 82.6 | 42.7 | 350 | 741 | 20 | 67 | 51 | 0.966 |
| 43 | 85.9 | 44.1 | 331 | 680 | 21 | 65 | 51 | 0.899 |
| 44 | 71.1 | 36.0 | 311 | 790 | 20 | 65 | 51 | 0.919 |
| 45 | 73.5 | 36.4 | 310 | 705 | 20 | 65 | 51 | 0.917 |
| 46 | 77.3 | 40.7 | 338 | 730 | 20 | 65 | 51 | 0.915 |
| 47 | 77.1 | 39.3 | 343 | 720 | 21 | 64 | 50 | 0.917 |
| 48 | 72.2 | 35.0 | 349 | 670 | 22 | 64 | 50 | 0.918 |
| 49 | 68.5 | 35.0 | 310 | 643 | 20 | 69 | 52 | 0.901 |
| 50 | 72.3 | 35.7 | 323 | 680 | 20 | 67 | 52 | 0.907 |
| 51 | 75.4 | 38.5 | 331 | 700 | 20 | 67 | 51 | 0.910 |
| 52 | 81.1 | 40.5 | 335 | 720 | 20 | 66 | 51 | 0.902 |
| 53 | 77.5 | 39.1 | 349 | 680 | 22 | 64 | 52 | 0.909 |
| 54 | 53.1 | 35.4 | 369 | 615 | 20 | 61 | 51 | 0.907 |
| 55 | 120.1 | 48.5 | 441 | 841 | 21 | 70 | 52 | 1.199 |
| 56 | 108.2 | 45.3 | 392 | 829 | 21 | 69 | 52 | 1.150 |
| 57 | 91.3 | 42.7 | 355 | 827 | 22 | 65 | 51 | 0.992 |
| 58 | 84.5 | 39.9 | 379 | 825 | 22 | 67 | 51 | 0.992 |
| 59 | 70.4 | 35.0 | 333 | 700 | 23 | 61 | 51 | 0.781 |
| 60 | 71.4 | 36.1 | 300 | 780 | 21 | 55 | 50 | 0.750 |
| 61 | 89.3 | 43.9 | 358 | 976 | 22 | 63 | 48 | 1.006 |
| 62 | 79.1 | 42.1 | 365 | 899 | 21 | 63 | 48 | 1.006 |
| 63 | 78.8 | 40.4 | 402 | 854 | 20 | 65 | 49 | 0.913 |
| 64 | 78.4 | 42.7 | 360 | 741 | 20 | 67 | 49 | 0.966 |
| 65 | 81.3 | 38.6 | 301 | 562 | 20 | 71 | 49 | 0.980 |
| Comparative Example | | | | | | | | |
| 1 | 35.2 | 18.1 | 260 | 140 | 18 | 48 | 57 | 0.964 |
| 2 | 42.6 | 22.3 | 274 | 205 | 17 | 48 | 55 | 0.982 |
| 3 | 50.6 | 27.1 | 256 | 186 | 18 | 50 | 53 | 0.990 |
| 4 | 48.9 | 23.2 | 282 | 132 | 17 | 49 | 56 | 0.966 |
| 5 | 52.3 | 24.6 | 312 | 183 | 17 | 48 | 55 | 0.968 |
| 6 | 57.1 | 25.2 | 315 | 201 | 18 | 48 | 53 | 0.970 |
| 7 | 42.3 | 22.1 | 101 | 180 | 18 | 44 | 47 | 1.031 |
| 8 | 48.1 | 26.3 | 113 | 202 | 20 | 45 | 49 | 0.999 |
| 9 | 53.1 | 31.2 | 156 | 253 | 24 | 48 | 52 | 0.979 |
| 10 | 41.6 | 21.3 | 98 | 163 | 17 | 44 | 46 | 0.104 |
| 11 | 46.2 | 24.3 | 114 | 186 | 18 | 45 | 49 | 1.000 |
| 12 | 51.3 | 26.7 | 145 | 236 | 22 | 47 | 53 | 1.031 |
| 13 | 67.2 | 31.0 | 201 | 251 | 39 | 42 | 52 | 1.028 |
| 14 | 48.7 | 21.7 | 435 | 85 | 21 | 31 | 63 | 1.105 |
| 15 | 52.4 | 20.3 | 120 | 202 | 21 | 41 | 36 | 1.029 |
| 16 | 71.3 | 36.0 | 255 | 250 | 20 | 60 | 42 | 0.987 |
| 17 | 68.8 | 32.5 | 246 | 286 | 21 | 61 | 36 | 1.102 |

TABLE 1-continued

|  | TS (kg/cm²) | TRS (kg/cm) | EL (%) | AR (NBS, %) | PEI (part) | HD (shore A) | SFC (m) | DT (g/cm³) |
|---|---|---|---|---|---|---|---|---|
| 18 | 25.2 | 15.0 | 61 | 83 | 14 | 35 | 28 | 0.810 |
| 19 | 18.0 | 9.0 | 48 | 61 | 12 | 21 | 37 | 0.613 |

Note:
[1] TS means tensile strength.
[2] TRS means tear strength.
[3] EL means elongation.
[4] AR means abrasion rate.
[5] PEI means permanent elongation.
[6] HD means hardness.
[7] SFC means static frictional coefficient.
[8] DT means density.

The results of said table 3 shows that when a modifier or compatible agent was added, or a PVC base was blended with both a suspended polymerization type and emulsified polymerization type, as in this invention, the tensile strength was increased by approx. 50 part compared with the Comparison, tear strength by 10 part and elongation by 25 part. In particular, for the actual application as a shoe material, the following paraters—abrasion-resistance, permanent elongation increase and static frictional coefficient—play the important roles. As far as the thermoplastic PVC foam composition manufactured in accordance with this invention is concerned, the static frictional coefficient was increased by 20 part and abrasion-resistance by approx. 200 to 400 part, compared with the Comparison. In addition, it is noted that the permanent elongation increase was reduced by 25 part, thus demonstrating a remarkable restoring property to the original state.

What is claimed is:

1. A thermoplastic PVC foam composition, comprising: a PVC base; one or more modifiers, present in an amount of 10 to 90 parts by weight based on 100 parts by weight of the PVC base, wherein the modifier includes a material selected from the group of a rubber, a thermoplastic urethane compound, and an ethylene-vinyl acetate copolymer; and an acrylonitrile-graft PVC material, present in an amount of 0.5 to 40 parts by weight based on 100 parts by weight of the PVC base.

2. The composition according to claim 1, wherein said PVC base comprises a mixture of a suspended PVC and an emulsified PVC, wherein the suspended/emulsified PVCs are present in a ratio of 99.5:0.5 to 0.5:99.5 parts by weight.

3. The composition according to claim 1, wherein said modifier includes a rubber selected from the group of butadiene rubber, styrene-butadiene rubber, acrylonitrile-butadiene rubber, isoprene rubber, and natural rubber.

4. The composition according to claim 1, wherein the modifier includes an ethylene-vinyl acetate copolymer having a melt flow index in the range of 0.5 to 450 g/10 minutes, and wherein a graft copolymerization rate of said vinyl acetate is in the range of 0.5 to 60 mol %.

5. The composition according to claim 3, wherein said modifier includes an acrylonitrile-butadiene rubber in a granular form, and wherein a graft copolymerization rate of said acrylonitrile is in the range of 0.5 to 40 mol %.

6. The composition according to claim 1, wherein the acrylonitrile-graft PVC material has a graft copolymerization rate of said acrylonitrile in the range of 0.5 to 45 mol %.

7. The composition according to claim 1, further including a plasticizer.

8. The composition according to claim 1, further including a stabilizer.

9. The composition according to claim 1, further including a lubricant.

10. The composition according to claim 1, further including a foaming agent.

11. The composition according to claim 1, further including a filler.

12. The composition according to claim 1, further including a coloring agent.

13. The composition according to claim 1, further including an antioxidant.

* * * * *

UNITED STATES PATENT AND TRADEMARK OFFICE
CERTIFICATE OF CORRECTION

PATENT NO. : 5,776,993
DATED : July 7, 1998
INVENTOR(S) : Shin et al.

It is certified that error appears in the above-identified patent and that said Letters Patent is hereby corrected as shown below:

Title page,
Should be deleted to appear as per attached title page.

Please delete drawing sheets 1-16 and substitute drawing sheets 1-16 as per attached.

Signed and Sealed this

Eighteenth Day of September, 2001

Attest:

*Nicholas P. Godici*

NICHOLAS P. GODICI
*Attesting Officer*    *Acting Director of the United States Patent and Trademark Office*

United States Patent [19]

Shin et al.

[11] Patent Number: 5,776,993
[45] Date of Patent: Jul. 7, 1998

[54] THERMOPLASTIC PVC FOAM COMPOSITION

[75] Inventors: Bong Sub Shin; Jae Yeon Lee; Dong Keun Kim; Seoun Jun Kim; Sung Ok Cho, all of Pusan, Rep. of Korea

[73] Assignees: Korea Institute of Footwear & Leather Technology; HS Corporation, both of Pusan, Rep. of Korea

[21] Appl. No.: 697,948

[22] Filed: Sep. 3, 1996

[30] Foreign Application Priority Data

Mar. 12, 1996 [KR] Rep. of Korea ............ 96-6444

[51] Int. Cl.$^6$ ............................................. C08J 9/00
[52] U.S. Cl. ........................... 521/140; 521/75; 521/134; 521/137; 521/139; 521/140
[58] Field of Search ........................... 521/145, 137, 521/134, 139, 140, 75

[56] References Cited

U.S. PATENT DOCUMENTS

| | | | |
|---|---|---|---|
| 2,901,774 | 9/1959 | Pooley | 521/75 |
| 3,632,533 | 1/1972 | Winkler | 521/75 |
| 3,695,477 | 10/1972 | Edmonson et al. | 521/75 |
| 3,708,441 | 1/1973 | Joslyn et al. | 521/137 |
| 3,944,508 | 3/1976 | Barth et al. | 521/134 |
| 4,228,245 | 10/1980 | Morgan et al. | 521/75 |
| 4,245,055 | 1/1981 | Smith | 521/140 |
| 4,454,250 | 6/1984 | Florence et al. | 521/75 |
| 4,956,222 | 9/1990 | Matsuura et al. | 521/134 |

FOREIGN PATENT DOCUMENTS

| | | |
|---|---|---|
| 3-114740 | 5/1991 | European Pat. Off. |
| 0 409 992 | 1/1991 | Japan |

*Primary Examiner*—Morton Foelak
*Attorney, Agent, or Firm*—Finnegan, Henderson, Farabow, Garrett & Dunner, L.L.P.

[57] ABSTRACT

This invention relates to a thermoplastic PVC foam composition and more particularly, to a thermoplastic PVC foam composition suitable for a shoe material, which is characterized by the following fabrication technique and advantages. Some plasticizer and additive are added to the PVC base, plasticized by dioctyl phthalate or epoxide soybean oil to obtain the thermoplastic PVC foam composition. Then, one type of compound, selected from rubber, thermoplastic urethane compound, and ethylene-vinyl acetate copolymer, was added to the mixture for modification. The desired product, so formed, has some advantages in that: a) it can be foamed by an extruder and injector including a heating press, b) the composition, so foamed, can be regenerated, c) the desired product is light due to its low specific gravity, and d) its physical properties, anti-slip, abrasion-resistance and adhesiveness with other materials, are remarkable.

13 Claims, No Drawings

THERMOPLASTIC PVC FOAM COMPOSITION

BACKGROUND OF THE INVENTION

1. Field of the Invention

This invention relates to a thermoplastic PVC foam composition and more particularly, to a thermoplastic PVC foam composition suitable for a shoe material, which is characterized by the following fabrication techniques and advantages:

Some plasticizer and additive are added to the PVC base, plasticized by dioctyl phthalate (hereinafter called "DOP") or epoxide soybean oil (hereinafter called "ESO") to obtain the thermoplastic PVC foam composition. Then, one type of compound, selected from rubber, thermoplastic urethane compound (hereinafter called "TPU"), and ethylene-vinyl acetate copolymer (hereinafter called "EVA"), was added to the mixture for modification. The desired product, so formed, has recognized some advantages in that: a) it may be foamed by an extruder and injector including a heating press, b) the composition, so foamed, can be regenerated, c) the desired product is light due to its low specific gravity, and d) its physical properties, anti-slip, abrasion-resistance and adhesiveness with other materials, are remarkable.

2. Description of the Prior Art

Vulcanized rubber, which has been commonly used as a shoe material hitherto, has some recognized advantages in terms of its mechanical properties, abrasion-resistance and anti-chemicals.

Nonetheless, its fabrication and molding processes are quite complicated, and in case of crosslinking, some covalent bonds are formed by the molecular chains, thus preventing regeneration. In this respect, the need for a new elastomer with superior fabrication and molding properties to the existing materials, as well as possible regeneration, has been on the rapid increase.

To cope with this situation, a method of applying PVC to a shoe material has been disclosed in U.S. Pat. No. 5,126,378. However, the material, prepared as aforementioned, has some disadvantages in that: a) it is easily slipped due to its strong plastic property at room temperature, and b) commercial application proved to be unavailable due to its poor adhesiveness with other materials. In addition to this method, another method of using stylene-butadiene degree opolymer, in a single manner or as a base, designed for shoe applications has been disclosed in Japanese Patent No. 50082-162, but the method proved to be uneconomical due to its poor adhesiveness and low abrasion-resistance.

Therefore, the inventor has endeavored to develop a rubber-substitution material having remarkable physical properties, which may be melted by heat, wherein the material has appearance and anti-slip properties similar to rubber. The inventor finally succeeded by preparing a modified thermoplastic PVC foam composition including one kind of modifier selected from natural or synthetic rubber, TPU, and EVA in a PVC base.

SUMMARY OF THE INVENTION

The primary object of this invention is to provide a thermoplastic PVC foam composition suitable for a shoe material, with the following advantages: a) the physical properties—modulus of elasticity, tensile strength and tear strength—are remarkable, b) the specific gravity is low, c) foam-molding is available, and d) man-made leather and melt adhesive strength are remarkable.

The present invention relates to a thermoplastic PVC foam composition comprising a PVC base, plasticizers and other additives, characterized in which one or more modifiers of 10 or 90 parts by weight, selected from the group of rubber, thermoplastic urethane compound and ethylene-vinyl acetate copolymer, are added to the PVC base of 100 parts by weight for modification thereof.

The present invention also relates to the thermoplastic PVC foam composition, wherein 0.5 to 40 parts by weight PVC, graft-polymerized by acrylonitrile (hereinafter called "AN"), a compatible agent, are added in proportion to the PVC base of 100 parts by weight Further, the PVC base is characterized by mixing the PVC in suspended/emulsified polymerization types by the mixing ratio of 99.5:0.5 to 0.5:99.5 parts by weight, respectively.

DETAILED DESCRIPTION OF THIS INVENTION

The present invention is described in more detail as set forth hereunder.

This invention relates to a substitution material for vulcanized rubber having remarkable physical properties prepared by adding a modifier, selected from rubber, TPU and EVA, to a PVC resin mixed with some additives such as vesicant, stabilizer, etc.

The polymerization degree of the PVC base of this invention is in the range of 600 to 2,700, and the PVC base is prepared for use by mixing the PVC in the emulsified/suspended polymerization forms in a ratio of 99.5:0.5 to 0.5:99.5 parts by weight, preferably by the ratio of 80:20 to 20:80 parts by weight.

In general, if the polymerization degree of the PVC is less than 600, the fluidity is remarkable, but its abrasion-resistant rate and modulus of elasticity are low. If the polymerization degree of the PVC exceeds 2,700, its physical properties are remarkable, but a low fluidity is responsible for reducing the stability of the cell in foaming. Additionally, the PVC in the emulsified polymerization form is superior to that in the suspended polymerization form in terms of thermal stability and the cell's stability in foaming. According to this invention, therefore, the PVC is prepared by mixing two types of polymerization bases in the emulsified and suspended form.

For the manufacture of a thermoplastic PVC foam composition according to this invention, rubber, to sustain the flexibility at low temperatures and to exhibit a modulus of elasticity like rubber, may be used as a modifier; for example, one or more mixtures selected from butadiene rubber (hereinafter called "BR"), stylene-butadiene rubber (hereinafter called "SBR"), acrylonitrile-butadiene rubber (hereinafter called "NBR"), isoprene rubber (hereinafter called "IR"), and natural rubber (hereinafter called "NR") can be used. In particular, NBR has a good compatibility to PVC and reduces the switch-over of plasticizer. NBR, a copolymer of both AN and butadiene, demonstrates a variety of properties in accordance with the graft copolymerization rate of the AN. The graft copolymerization rate of AN from commercially available NBR is in the range of 0.5 to 45 mol %, and the AN is in the granular form.

As for the NBR used in this invention, if the graft copolymerization rate of AN is less than 0.5 mol %, the switch-over of plasticizer is significantly increased, and thus its poor compatibility to PVC may lead to lowering the physical property of the desired product. Furthermore, if acrylonitrile exceeds 40 mol %, the grafted NBR shows a poor property at a low temperature.

EVA, another modifier, is effectively used for improving the thermal bonding properties and melt viscosity related to PVC. Hence, the EVA demonstrates a variety of physical properties in accordance with the graft copolymerization rate of vinylacetate (hereinafter called "VA") and melt flow index (hereinafter called "MI"). In the case where EVA resin is used in this invention, the graft copolymerization rate of VA is in the range of 0.5 to 60 mol % with MI in the range of 0.5 to 450 g/10 mins.

If the graft copolymerization rate of VA is less than 0.5 mol %, some properties—flexibility, elasticity, low-temperature, impact-resistance, adhesiveness and anti-slip—should be reduced.

Further, TPU is very effectively used not only for enhancing the low-temperature property of PVC, but also for increasing the initial modulus of elasticity.

According to this invention, one modifier of 1.0 to 90 parts by weight, selected from NBR, TPU and EVA, is added to the PVC base of 100 parts.

Hence, if the modifier is used in an amount of less than 1.0 part by weight, the appearance becomes poor owing to similar movement to strengthened plastic, and in the case where the level of 90 parts by weight is exceeded, the fabrication properties becomes poor.

According to this invention, in addition to the modifier, acrylonitrile-grafted PVC suitable for a shoe material may be added as a compatible agent.

The compatible agent may enhance the compatibility of the PVC base with a modifier brand, thus promoting the physical property of the foam and reducing the melt viscosity of the brand, which may in turn enhance the fabrication property. Hence, the compatible agent demonstrates a variety of physical properties in accordance with the graft copolymerization rate of AN over PVC. As far as the compatible agent used in this invention is concerned, the graft copolymerization rate of AN is in the range of 0.5 to 45 mol %, and preferably, the graft copolymerization rate of AN is in the range of 25 mol % over PVC.

The compatible agent is added in 0.5 to 40 parts by weight in proportion to the PVC base of 100 parts by weight. If the content of the compatible agent is less than 0.5 parts by weight, the physical property is sharply reduced, and in the case where the level of 40 parts by weight is exceeded, the coloring of the product becomes turbid with increasing hardness.

In the case where a vesicant designed to manufacture the thermoplastic PVC foam of this invention is used, one or more organic vesicants in adjusted part by weight is/are blended for use.

Their content is 0.1 to 5.0 parts by weight in proportion to the desired product of 100 parts by weight. If the vesicant containing less than 0.1 parts by weight is used, the foaming rate becomes low, and if the vesicant exceeds the level of 5.0 parts by weight, the shape of the product may not be maintained.

The organic vesicants used in this invention are azodicarbonamide (hereinafter called "ADCA"), p,p'-oxy (benzenesulfonyl) hydrazide (hereinafter called "OBSH"), p-toluenesulfonyl hydrazide (hereinafter called "TSH"), zinc ditoluenesulfinate (hereinafter called "TM"), and p-toluenesulfonylsemicarbazide (hereinafter called "TS").

Among the above-mentioned vesicants, the ADCA-type produces large amounts of gas when foamed and is stable at high temperatures, but it is liable to be discolored due to the remaining materials. However, the OBSH-type is foamed at relatively low temperatures, and its property is remarkable as the first vesicant.

As a foaming promoter, zinc oxide (ZnO) or TM of 0.5 to 200 parts by weight may be used in proportion to vesicant of 100 parts by weight.

Concurrent use of vesicants has an advantage of modulating the foaming temperature to its use.

As for other additives, the following agents may be used in proportion to the PVC base of 100 parts by weight: antioxidant of 0.1 to 3.0 parts by weight, UV stabilizer of 0.1 to 2.0 parts by weight, coloring agent of 0.1 to 5.0 parts by weight, lubricant of 0.1 to 30 parts by weight, and filler of 0.1 to 100 parts by weight. The lubricant may include macromolecule aromatic compounds, ester compounds, or EVA having a high MI. Further, carbon black, calcium carbonate, or silica may be used as a filler.

Based on the composition, the method of manufacturing the thermoplastic PVC foam is described in more detail as set forth hereunder.

The PVC is charged to a mixing device such as a supermixer, with the addition of plasticizer in adjusted part by weight and additive, and the mixture is further mixed and plasticized at room temperature for 5 to 10 mins. Then, one modifier, selected from rubber, TPU and EVA, is added to the plasticization-completed resin, followed by continuous mixture for another 5 to 10 mins for the pelletization process using an extruder at an internal temperature of 120 to 170° C. If the temperature of the extruder is less than 120° C., the resin cannot be melted, and if the temperature exceeds 170° C., the foaming efficiency of the mixture is reduced.

The mixture, so manufactured from the aforementioned method, is extruded and injected at 160 to 190° C. so that a variety of vesicant products may be fabricated.

As described above, the PVC foam manufactured in accordance with this invention may be used as a substitution material for existing rubber owing to its remarkable physical properties compared with conventional vulcanized rubbers, i.e., abrasion-resistance, anti-slip and adhesiveness. In particular, the PVC foam is very useful as a shoe material.

This invention is explained in more detail by the following examples, but the claims are not limited to these examples.

EXAMPLE 1

The PVC base according to this invention was prepared by blending PVC of 80 parts by weight in the emulsified polymerization form (manufacturer: Hanwha Chemical Co.) having a polymerization degree of 1,000 and PVC of 20 parts by weight in the suspended polymerization form, having the same polymerization degree as above (manufacturer: Hanwha Chemical Co.). The following agents were added to the PVC mixture of 100 parts by weight as readjusted as above: a) a co-plasticizer of 100 parts by weight, prepared by mixing DOP (manufacturer: Hanwha Chemical Co.) and ESO (manufacturer: Songwon Chemical Co.), b) a co-stabilizer of 2.0 parts by weight, prepared by mixing butyl-stearate of 5.0 parts by weight (manufacturer: Songwon Chemical Co.) as a lubricant, foaming stabilizer, and antioxidant, and c) a co-vesicant 6.0 parts by weight, prepared by mixing calcium carbonate of 20 parts by weight as a filler and three types of vesicant containing the same parts by weight (ADCA, OBSH and TSH (manufacturer: Dongjin Hwasung Co.)). The mixture was mixed and plasticized in a supermixer for 5 to 10 mins. Then, after the addition of NBR (manufacturer: Goodyear) of 20 parts by weight and compatible agent of 10 parts by weight to the plasticization-completed resin, the mixture was continuously mixed for 5 to 10 mins until the compounding agent was homogeneously dispersed and pelletized using an extruder at an internal temperature of 120 to 170° C. For the compatible agent used in this example, it was prepared in a reactor by a solution-polymerization process using PVC in the suspended polymerization form, having a polymerization degree of 1,000 (manufacturer: Hanwha Chemical Co.) and AN (manufacturer: Junsei Co.).

Hence, AN, graft copolymerization rate in proportion to PVC: 25 mol %, was employed as the compatible agent.

EXAMPLES 2–4

The desired product was manufactured in the same manner as in Example 1, except the fact that, as shown in the following Table 1, the PVC base was prepared by blending different mixing ratios of PVC in the emulsified polymerization form, having a polymerization degree of 1,000 (manufacturer: Hanwha Chemical Co.), and PVC in the suspended polymerization form having the same polymerization degree (Hanwha Chemical Co.).

EXAMPLES 5–8

The desired product was manufactured in the same manner as in Example 1, except the fact that, as shown in the following Table 1, the PVC base was prepared by blending different mixing ratios of PVC in the emulsified polymerization form, having a polymerization degree of 1,700 (manufacturer: Hanwha Chemical Co.), and a PVC in the suspended polymerization form, having the same polymerization degree (Hanwha Chemical Co.).

EXAMPLES 9–12

The desired product was manufactured in the same manner as in Example 1, except the fact that, as shown in the following Table 1, the PVC base was prepared by blending different mixing ratios of PVC in the emulsified polymerization form, having a polymerization degree of 2,500 (manufacturer: Hanwha Chemical Co.), and PVC in the suspended polymerization form, having the same polymerization degree (Hanwha Chemical Co.).

EXAMPLES 13–16

The desired product was manufactured in the same manner as in Example 1, except the fact that, as shown in the following Table 1, the PVC base was prepared by blending different mixing ratios of PVC in the emulsified polymerization form, having a polymerization degree of 1,000 (manufacturer: Hanwha Chemical Co.) and PVC in the suspended polymerization form, having a polymerization degree of 2,500 (Hanwha Chemical Co.).

EXAMPLE 17

The PVC base according to this invention was prepared by blending PVC of 20 parts by weight in the emulsified-polymerization form (manufacturer: Hanwha Chemical Co.), having a polymerization degree of 1,000, and PVC of 80 parts by weight in the suspended polymerization form, having a polymerization degree of 2,500 (manufacturer: Hanwha Chemical Co.). The following agents were added to the PVC mixture of 100 parts by weight as readjusted as above: a) a co-plasticizer of 90 parts by weight, prepared by mixing DOP (manufacturer: Hanwha Chemical Co.) and ESO (manufacturer: Songwon Chemical Co.), b) a co-vesicant of 6.0 parts by weight, prepared by mixing butyl stearate of 5.0 parts by weight (manufacturer: Songwon Chemical Co.) as a lubricant, zinc-type stabilizer of 2.0 parts by weight, calcium carbonate of 20 parts by weight as a filler and three types of vesicant (ADCA, OBSH and TSH (manufacturer: Dongjin Hwasung Co.)) in a same part by weight. The mixture was mixed and plasticized by a super-mixer for 5 to 10 mins. Then, after the addition of NBR (manufacturer: Goodyear) of 20 parts by weight and compatible agent of 10 parts by weight to the plasticization-completed resin, the mixture was continuously mixed for 5 to 10 mins until the compounding agent was homogeneously dispersed, and pelletized using an extruder at an internal temperature of 120 to 170° C.

EXAMPLES 18–23

The desired product was manufactured in the same manner as in Example 17, except for the different composition ratio of plasticizer, as represented in the following Table 1.

EXAMPLES 24–29

The desired product was manufactured in the same manner as in Example 17, except for the fact that the addition amount of NBR (manufacturer: Goodyear Co.) as a modifier was different in proportion to the PVC base of 100 parts by weight, as represented in the following Table 1.

EXAMPLES 30–34

The desired product was manufactured in the same manner as in Example 17, except for the fact that the addition amount of TPU (manufacturer: Sunkyong Ind.) as a modifier was different in proportion to the PVC base of 100 parts by weight, as represented in the following Table 1.

EXAMPLES 35–39

The desired product was manufactured in the same manner as in Example 17, except for the fact that the addition amount of EVA (manufacturer: Dongsung Chemical Co.) as a modifier was different in proportion to the PVC base of 100 parts by weight, as represented in the following Table 1. An EVA resin having a graft copolymerization rate of vinylacetate of 20 mol %, MI: 20 g/10 mins, was used.

EXAMPLES 40–43

The desired product was manufactured in the same manner as in Example 17, except for the fact that the addition amount of AN base-copolymerized PVC as a compatible agent was different in proportion to the PVC base of 100 parts by weight, as represented in the following Table 1.

For the compatible agent used in this invention, it was prepared in a reactor by the solution-polymerization process using PVC in the suspended polymerization form having a polymerization degree of 1,000 (manufacturer: Hanwha Chemical Co.) and AN (manufacturer: Junsei Co.).

AN in a graft copolymerization rate in proportion to PVC of 25 mol % was employed.

EXAMPLES 44–47

The desired product was manufactured in the same manner as in Example 17, except for the fact that the addition amount of co-stabilizer containing foaming promoter and antioxidant was different, as represented in the following Table 1. For the stabilizer used in this invention, foaming promoter zinc oxide (manufacturer: Hanil Chemical Co.), antioxidant (manufacturer: Ciba-Geigy) and UV stabilizer (manufacturer: Ciba-Geigy) were blended in the same ratio for use.

EXAMPLES 48~53

The desired product was manufactured in the same manner as in Example 17, except for the fact that the addition amount of butyl stearate (manufacturer: Songwon Chemical Co.) as a lubricant was different, as represented in the following Table 1.

EXAMPLES 54~59

The desired product was manufactured in the same manner as in Example 17, except for the fact that the addition amount of vesicant was different, as represented in the following Table 1. For the vesicant used in this invention, three types of vesicant (ADCA, OBSH and TSH (manufacturer: Dongjin Hwasung Co.)) were used in the same parts by weight.

EXAMPLES 60~65

The desired product was manufactured in the same manner as in Example 17, except for the fact that the addition amount of calcium carbonate (manufacturer: Songwon Chemical Co.) as a filler was different, as represented in the following Table 1.

TABLE 1

| Example | Base | | | | | | Co-plasticizer[7] | Compatible agent[8] | Modifier | | | Additive | | | |
|---|---|---|---|---|---|---|---|---|---|---|---|---|---|---|---|
| | $S1^{1)}$ | $S2^{2)}$ | $S3^{3)}$ | $E1^{4)}$ | $E2^{5)}$ | $E3^{6)}$ | | | Rubber[9] | $TPU^{10)}$ | $EVA^{11)}$ | Co-stabilizer[12] | Lubricant[13] | Co-foaming agent[14] | Filler[15] |
| 1 | 80 | — | — | 20 | — | — | 100 | 10 | 20 | — | — | 2.0 | 5.0 | 6.0 | 20 |
| 2 | 60 | — | — | 40 | — | — | 100 | 10 | 20 | — | — | 2.0 | 5.0 | 6.0 | 20 |
| 3 | 40 | — | — | 60 | — | — | 100 | 10 | 20 | — | — | 2.0 | 5.0 | 6.0 | 20 |
| 4 | 20 | — | — | 80 | — | — | 100 | 10 | 20 | — | — | 2.0 | 5.0 | 6.0 | 20 |
| 5 | — | 80 | — | — | 20 | — | 100 | 10 | 20 | — | — | 2.0 | 5.0 | 6.0 | 20 |
| 6 | — | 60 | — | — | 40 | — | 100 | 10 | 20 | — | — | 2.0 | 5.0 | 6.0 | 20 |
| 7 | — | 40 | — | — | 60 | — | 100 | 10 | 20 | — | — | 2.0 | 5.0 | 6.0 | 20 |
| 8 | — | 20 | — | — | 80 | — | 100 | 10 | 20 | — | — | 2.0 | 5.0 | 6.0 | 20 |
| 9 | — | — | 80 | — | — | 20 | 100 | 10 | 20 | — | — | 2.0 | 5.0 | 6.0 | 20 |
| 10 | — | — | 60 | — | — | 40 | 100 | 10 | 20 | — | — | 2.0 | 5.0 | 6.0 | 20 |
| 11 | — | — | 40 | — | — | 60 | 100 | 10 | 20 | — | — | 2.0 | 5.0 | 6.0 | 20 |
| 12 | — | — | 20 | — | — | 80 | 100 | 10 | 20 | — | — | 2.0 | 5.0 | 6.0 | 20 |
| 13 | 80 | — | — | — | — | 20 | 100 | 10 | 20 | — | — | 2.0 | 5.0 | 6.0 | 20 |
| 14 | 60 | — | — | — | — | 40 | 100 | 10 | 20 | — | — | 2.0 | 5.0 | 6.0 | 20 |
| 15 | 40 | — | — | — | — | 60 | 100 | 10 | 20 | — | — | 2.0 | 5.0 | 6.0 | 20 |
| 16 | 20 | — | — | — | — | 80 | 100 | 10 | 20 | — | — | 2.0 | 5.0 | 6.0 | 20 |
| 17 | 20 | — | — | — | — | 80 | 90 | 10 | 20 | — | — | 2.0 | 5.0 | 6.0 | 20 |
| 18 | 20 | — | — | — | — | 80 | 80 | 10 | 20 | — | — | 2.0 | 5.0 | 6.0 | 20 |
| 19 | 20 | — | — | — | — | 80 | 70 | 10 | 20 | — | — | 2.0 | 5.0 | 6.0 | 20 |
| 20 | 20 | — | — | — | — | 80 | 60 | 10 | 20 | — | — | 2.0 | 5.0 | 6.0 | 20 |
| 21 | 20 | — | — | — | — | 80 | 50 | 10 | 20 | — | — | 2.0 | 5.0 | 6.0 | 20 |
| 22 | 20 | — | — | — | — | 80 | 40 | 10 | 20 | — | — | 2.0 | 5.0 | 6.0 | 20 |
| 23 | 20 | — | — | — | — | 80 | 30 | 10 | 20 | — | — | 2.0 | 5.0 | 6.0 | 20 |
| 24 | 20 | — | — | — | — | 80 | 80 | 10 | 1.0 | — | — | 2.0 | 5.0 | 6.0 | 20 |
| 25 | 20 | — | — | — | — | 80 | 80 | 10 | 5.0 | — | — | 2.0 | 5.0 | 6.0 | 20 |
| 26 | 20 | — | — | — | — | 80 | 80 | 10 | 10 | — | — | 2.0 | 5.0 | 6.0 | 20 |
| 27 | 20 | — | — | — | — | 80 | 80 | 10 | 20 | — | — | 2.0 | 5.0 | 6.0 | 20 |
| 28 | 20 | — | — | — | — | 80 | 80 | 10 | 30 | — | — | 2.0 | 5.0 | 6.0 | 20 |
| 29 | 20 | — | — | — | — | 80 | 80 | 10 | 40 | — | — | 2.0 | 5.0 | 6.0 | 20 |
| 30 | 20 | — | — | — | — | 80 | 80 | 10 | — | 5.0 | — | 2.0 | 5.0 | 6.0 | 20 |
| 31 | 20 | — | — | — | — | 80 | 80 | 10 | — | 10 | — | 2.0 | 5.0 | 6.0 | 20 |
| 32 | 20 | — | — | — | — | 80 | 80 | 10 | — | 20 | — | 2.0 | 5.0 | 6.0 | 20 |
| 33 | 20 | — | — | — | — | 80 | 80 | 10 | — | 30 | — | 2.0 | 5.0 | 6.0 | 20 |
| 34 | 20 | — | — | — | — | 80 | 80 | 10 | — | 40 | — | 2.0 | 5.0 | 6.0 | 20 |
| 35 | 20 | — | — | — | — | 80 | 80 | 10 | — | — | 5.0 | 2.0 | 5.0 | 6.0 | 20 |
| 36 | 20 | — | — | — | — | 80 | 80 | 10 | — | — | 10 | 2.0 | 5.0 | 6.0 | 20 |
| 37 | 20 | — | — | — | — | 80 | 80 | 10 | — | — | 20 | 2.0 | 5.0 | 6.0 | 20 |
| 38 | 20 | — | — | — | — | 80 | 80 | 10 | — | — | 30 | 2.0 | 5.0 | 6.0 | 20 |
| 39 | 20 | — | — | — | — | 80 | 80 | 10 | — | — | 40 | 2.0 | 5.0 | 6.0 | 20 |
| 40 | 20 | — | — | — | — | 80 | 80 | 5.0 | 20 | — | — | 2.0 | 5.0 | 6.0 | 20 |
| 41 | 20 | — | — | — | — | 80 | 80 | 5.0 | 20 | — | — | 2.0 | 5.0 | 6.0 | 20 |
| 42 | 20 | — | — | — | — | 80 | 80 | 15 | 20 | — | — | 2.0 | 5.0 | 6.0 | 20 |
| 43 | 20 | — | — | — | — | 80 | 80 | 20 | 20 | — | — | 0.1 | 5.0 | 6.0 | 20 |
| 44 | 20 | — | — | — | — | 80 | 80 | 10 | 20 | — | — | 0.5 | 5.0 | 6.0 | 20 |
| 45 | 20 | — | — | — | — | 80 | 80 | 10 | 20 | — | — | 1.0 | 5.0 | 6.0 | 20 |
| 46 | 20 | — | — | — | — | 80 | 80 | 10 | 20 | — | — | 3.0 | 5.0 | 6.0 | 20 |
| 47 | 20 | — | — | — | — | 80 | 80 | 10 | 20 | — | — | 4.0 | 5.0 | 6.0 | 20 |
| 48 | 20 | — | — | — | — | 80 | 80 | 10 | 20 | — | — | 2.0 | 0.1 | 6.0 | 20 |
| 49 | 20 | — | — | — | — | 80 | 80 | 10 | 20 | — | — | 2.0 | 1.0 | 6.0 | 20 |
| 50 | 20 | — | — | — | — | 80 | 80 | 10 | 20 | — | — | 2.0 | 2.0 | 6.0 | 20 |
| 51 | 20 | — | — | — | — | 80 | 80 | 10 | 20 | — | — | 2.0 | 4.0 | 6.0 | 20 |
| 52 | 20 | — | — | — | — | 80 | 80 | 10 | 20 | — | — | 2.0 | 6.0 | 6.0 | 20 |
| 53 | 20 | — | — | — | — | 80 | 80 | 10 | 20 | — | — | 2.0 | 8.0 | 6.0 | 20 |
| 54 | 20 | — | — | — | — | 80 | 80 | 10 | 20 | — | — | 2.0 | 5.0 | 0.5 | 20 |
| 55 | 20 | — | — | — | — | 80 | 80 | 10 | 20 | — | — | 2.0 | 5.0 | 1.0 | 20 |

TABLE 1-continued

| Ex-am-ple | Base | | | | | | Co-plasti-cizer[7] | Compat-ible agent[8] | Modifier | | | Additive | | | |
|---|---|---|---|---|---|---|---|---|---|---|---|---|---|---|---|
| | S1[1] | S2[2] | S3[3] | E1[4] | E2[5] | E3[6] | | | Rubber[9] | TPU[10] | EVA[11] | Co-sta-bilizer[12] | Lubri-cant[13] | Co-foaming agent[14] | Filler[15] |
| 56 | 20 | — | — | — | — | 80 | 80 | 10 | 20 | — | — | 2.0 | 5.0 | 2.0 | 20 |
| 57 | 20 | — | — | — | — | 80 | 80 | 10 | 20 | — | — | 2.0 | 5.0 | 4.0 | 20 |
| 58 | 20 | — | — | — | — | 80 | 80 | 10 | 20 | — | — | 2.0 | 5.0 | 8.0 | 20 |
| 59 | 20 | — | — | — | — | 80 | 80 | 10 | 20 | — | — | 2.0 | 5.0 | 10.0 | 20 |
| 60 | 20 | — | — | — | — | 80 | 80 | 5.0 | 20 | — | — | 2.0 | 5.0 | 6.0 | 1.0 |
| 61 | 20 | — | — | — | — | 80 | 80 | 10 | 20 | — | — | 2.0 | 5.0 | 6.0 | 5 |
| 62 | 20 | — | — | — | — | 80 | 80 | 10 | 20 | — | — | 2.0 | 5.0 | 6.0 | 10 |
| 63 | 20 | — | — | — | — | 80 | 80 | 10 | 20 | — | — | 2.0 | 5.0 | 6.0 | 30 |
| 64 | 20 | — | — | — | — | 80 | 80 | 10 | 20 | — | — | 2.0 | 5.0 | 6.0 | 40 |
| 65 | 20 | — | — | — | — | 80 | 80 | 10 | 20 | — | — | 2.0 | 5.0 | 6.0 | 50 |

(Notes)
[1] PVC in the form of emulsified polymerization with an average polymerization degree of 1,000.
[2] PVC in the form of emulsified polymerization with an average polymerization degree of 1,700.
[3] PVC in the form of emulsified polymerization with an average polymerization degree of 2,500.
[4] PVC in the form of suspended polymerization with an average polymerization degree of 1,000.
[5] PVC in the form of suspended polymerization with an average polymerization degree of 1,700.
[6] PVC in the form of suspended polymerization with an average polymerization degree of 2,500.
[7] Plasticizer where DOP (dioctyl phthalate) and ESO (epoxided soybean oil) are adjusted to 50:50 parts by weight, respectively.
[8] Acrylonitrile-graft PVC (content of acrylonitrile: 25 mol %).
[9] Graft copolymerization rate (acrylonitrile: 30 mol %) and acrylonitrile-butadiene rubber in granular form.
[10] Thermoplastic urethane elastomer compound.
[11] Graft copolymerization rate of vinyl acetate (20 mol %) and ethylene-vinylacetate copolymer (melt flow index: 20 g/10 mins).
[12] Antioxidant, foaming stabilizer, and mixture of UV-stabilizer.
[13] Butyl stearate.
[14] Vesicant where azodicarbonamide, p,p'-oxy(benzenesulfonyl hydrazide) and p-toluenesulfonyl hydrazide were blended in a certain composition ratio.
[15] Calcium carbonate.

COMPARATIVE EXAMPLE 1

The following agents were added to PVC of 100 parts by weight in the emulsified polymerization form, having a polymerization degree of 1,000 (manufacturer: Hanwha Chemical Co.): a) a co-plasticizer of 100 parts by weight, prepared by mixing DOP (manufacturer: Hanwha Chemical Co.) and ESO (manufacturer: Songwon Chemical Co.), b) a co-stabilizer of 2.0 parts by weight, prepared by mixing butyl-stearate of 5.0 parts by weight (manufacturer: Songwon Chemical Co.) as a lubricant, foaming stabilizer, and antioxidant, and c) a co-vesicant of 6.0 parts by weight, prepared by mixing calcium carbonate of 20 parts by weight as a filler and three types of vesicant containing the same parts by weight (ADCA, OBSH and TSH (manufacturer: Dongjin Hwasung Co.)). The mixture was mixed and plasticized within a supermixer for 5 to 10 mins. Then, after the addition of NBR (manufacturer: Goodyear) of 20 parts by weight and compatible agent of 10 parts by weight to the plasticization-completed resin, the mixture was continuously mixed for 5 to 10 mins until the compounding agent was homogeneously dispersed and pelletized using an extruder at an internal temperature of 120 to 170° C. For the compatible agent used in this example, it was prepared in a reactor by a solution-polymerization process using PVC in the suspended polymerization form having the polymerization degree of 1,000 (manufacturer: Hanwha Chemical Co.) and AN (manufacturer: Junsei Co.).

Hence, AN, having graft copolymerization rate in proportion to PVC of 25 mol %, was employed.

COMPARATIVE EXAMPLES 2–3

The desired product was manufactured in the same manner as in Comparative Example 1, except the fact that the PVC in the suspended polymerization form (manufacturer: Hanwha Chemical Co.) had different polymerization degrees, as represented in Table 2.

COMPARATIVE EXAMPLES 4–6

The desired product was manufactured in the same manner as in Comparative Example 1, except the fact that the PVC in the emulsified polymerization form (manufacturer: Hanwha Chemical Co.) had different polymerization degrees, as represented in Table 2.

COMPARATIVE EXAMPLES 7–12

The desired product was manufactured in the same manner as in Comparative Example 1, except the fact that no modifier was added, as represented in Table 2.

COMPARATIVE EXAMPLES 13–14

The desired product was manufactured in the same manner as in Comparative Example 1, except the fact that, as represented in Table 2, the PVC base was prepared by blending PVC of 20 parts by weight in the emulsified polymerization form, having a polymerization degree of 1,000 (manufacturer: Hanwha Chemical Co.) and PVC of 80 parts by weight in the suspended polymerization form, having a polymerization degree of 2,500 (Hanwha Chemical Co.), while adding no modifier.

COMPARATIVE EXAMPLE 15

The desired product was manufactured in the same manner as in Comparative Example 1, except the fact that no compatible agent was added, as represented in Table 2.

COMPARATIVE EXAMPLE 16

The desired product was manufactured in the same manner as in Comparative Example 1, except the fact that no lubricant was added, as represented in Table 2.

COMPARATIVE EXAMPLES 17–19

Then desired product was manufactured in the same manner as in Comparative Example 1, except the fact that the contents of co-vesicant were changed.

TABLE 2

| Comp. Example | Base | | | | | | Co-plasticizer[7] | Compatible agent[8] | Modifier | | | Additive | | | |
|---|---|---|---|---|---|---|---|---|---|---|---|---|---|---|---|
| | S1[1] | S2[2] | S3[3] | E1[4] | E2[5] | E3[6] | | | Rubber[9] | TPU[10] | EVA[11] | Co-stabilizer[12] | Lubricant[13] | Co-foaming agent[14] | Filler[15] |
| 1 | 100 | — | — | — | — | — | 100 | 10 | 20 | — | — | 2.0 | 5.0 | 6.0 | 20 |
| 2 | — | 100 | — | — | — | — | 100 | 10 | 20 | — | — | 2.0 | 5.0 | 6.0 | 20 |
| 3 | — | — | 100 | — | — | — | 100 | 10 | 20 | — | — | 2.0 | 5.0 | 6.0 | 20 |
| 4 | — | — | — | 100 | — | — | 100 | 10 | 20 | — | — | 2.0 | 5.0 | 6.0 | 20 |
| 5 | — | — | — | — | 100 | — | 100 | 10 | 20 | — | — | 2.0 | 5.0 | 6.0 | 20 |
| 6 | — | — | — | — | — | 100 | 100 | 10 | 20 | — | — | 2.0 | 5.0 | 6.0 | 20 |
| 7 | 100 | — | — | — | — | — | 100 | 10 | — | — | — | 2.0 | 5.0 | 6.0 | 20 |
| 8 | — | 100 | — | — | — | — | 100 | 10 | — | — | — | 2.0 | 5.0 | 6.0 | 20 |
| 9 | — | — | 100 | — | — | — | 100 | 10 | — | — | — | 2.0 | 5.0 | 6.0 | 20 |
| 10 | — | — | — | 100 | — | — | 100 | 10 | — | — | — | 2.0 | 5.0 | 6.0 | 20 |
| 11 | — | — | — | — | 100 | — | 100 | 10 | — | — | — | 2.0 | 5.0 | 6.0 | 20 |
| 12 | — | — | — | — | — | 100 | 100 | 10 | — | — | — | 2.0 | 5.0 | 6.0 | 20 |
| 13 | 20 | — | — | — | — | — | 80 | 100 | 10 | — | — | 2.0 | 5.0 | 6.0 | 20 |
| 14 | 20 | — | — | — | — | — | 80 | 100 | 10 | — | — | 2.0 | 5.0 | 6.0 | 20 |
| 15 | 20 | — | — | — | — | — | 80 | 100 | — | 20 | — | 2.0 | 5.0 | 6.0 | 20 |
| 16 | 20 | — | — | — | — | — | 80 | 100 | 10 | 20 | — | 2.0 | — | 6.0 | 20 |
| 17 | 20 | — | — | — | — | — | 80 | 90 | 10 | 20 | — | 2.0 | 5.0 | — | 20 |
| 18 | 20 | — | — | — | — | — | 80 | 80 | 10 | 20 | — | 2.0 | 5.0 | 15 | 20 |
| 19 | 20 | — | — | — | — | — | 80 | 70 | 10 | 20 | — | 2.0 | 5.0 | 20 | 20 |

(Notes)
[1] PVC in the form of emulsified polymerization with an average polymerization degree of 1,000.
[2] PVC in the form of emulsified polymerization with an average polymerization degree of 1,700.
[3] PVC in the form of emulsified polymerization with an average polymerization degree of 2,500.
[4] PVC in the form of suspended polymerization with an average polymerization degree of 1,000.
[5] PVC in the form of suspended polymerization with an average polymerization degree of 1,700.
[6] PVC in the form of suspended polymerization with an average polymerization degree of 2,500.
[7] Plasticizer where DOP (dioctyl phthalate) and ESO (epoxided soybean oil) are adjusted to 50:50 parts by weight, respectively.
[8] Acrylonitrile-graft PVC (content of acrylonitrile: 25 mol %).
[9] Graft copolymerization rate (acrylonitrile: 30 mol %) and acrylonitrile-butadiene rubber in granular form.
[10] Thermoplastic urethane elastomer compound.
[11] Graft copolymerization rate of vinyl acetate (20 mol %) and ethylene-vinylacetate copolymer (melt flow index: 20 g/10 mins).
[12] Antioxidant, foaming stabilizer, and mixture of UV-stabilizer.
[13] Butyl stearate.
[14] Vesicant where azodicarbonamide, p,p'-oxy(benzenesulfonyl hydrazide) and p-toluenesulfonyl hydrazide were blended in a certain composition ratio.
[15] Calcium carbonate.

EXPERIMENT

In line with the foams manufactured based on Examples 1–65 and Comparative Examples 1–19, the following parameters—tensile strength, tear strength, elongation, abrasion rate, permanent elongation increase, hardness, static frictional coefficient and density—were measured, as represented in the following Table 3.

Tensile strength measured by the method of ASTM D412;
Tear strength measured by the method of ASTM D624;
Elongation measured by the method of ASTM D412;
Abrasion rate measured by the method of ASTM D 1630;
Permanent elongation increase measured by the method of ASTM D 3574;
Hardness measured by the method of ASTM D2240;
Static frictional coefficient measured by the method of JIS L1095; and
Density measured by the method of ASTM D 792.

TABLE 3

| | TS (kg/cm$^2$) | TRS (kg/cm) | EL (%) | AR (NBS, %) | PEI (part) | HD (shore A) | SFC (m) | DT (g/cm$^3$) |
|---|---|---|---|---|---|---|---|---|
| Example | | | | | | | | |
| 1 | 60.0 | 35.0 | 365 | 400 | 20 | 55 | 61 | 0.975 |
| 2 | 61.2 | 35.1 | 335 | 410 | 21 | 56 | 60 | 0.985 |
| 3 | 60.1 | 35.3 | 320 | 408 | 22 | 57 | 59 | 0.992 |
| 4 | 62.1 | 37.3 | 315 | 415 | 20 | 56 | 59 | 1.052 |
| 5 | 65.5 | 35.0 | 350 | 570 | 20 | 57 | 57 | 0.954 |
| 6 | 75.3 | 35.1 | 330 | 561 | 23 | 56 | 54 | 0.950 |
| 7 | 72.9 | 35.4 | 317 | 510 | 22 | 56 | 55 | 0.949 |
| 8 | 77.1 | 38.5 | 315 | 540 | 21 | 55 | 56 | 0.947 |
| 9 | 64.1 | 36.0 | 303 | 720 | 22 | 56 | 56 | 0.954 |
| 10 | 66.3 | 36.5 | 302 | 690 | 21 | 58 | 55 | 0.922 |
| 11 | 63.5 | 35.0 | 304 | 660 | 20 | 57 | 55 | 0.899 |
| 12 | 68.7 | 38.1 | 305 | 640 | 20 | 56 | 55 | 0.887 |

TABLE 3-continued

|    | TS (kg/cm²) | TRS (kg/cm) | EL (%) | AR (NBS, %) | PEI (part) | HD (shore A) | SFC (m) | DT (g/cm³) |
|----|-------------|-------------|--------|-------------|------------|--------------|---------|------------|
| 13 | 60.1  | 38.4 | 412 | 420   | 21 | 55 | 58 | 0.985 |
| 14 | 62.3  | 41.4 | 325 | 468   | 23 | 56 | 56 | 0.987 |
| 15 | 66.4  | 43.3 | 445 | 489   | 25 | 56 | 55 | 0.988 |
| 16 | 70.5  | 38.5 | 316 | 585   | 20 | 60 | 55 | 0.878 |
| 17 | 80.4  | 45.0 | 300 | 615   | 21 | 57 | 55 | 0.869 |
| 18 | 90.0  | 50.0 | 300 | 786   | 21 | 60 | 55 | 0.860 |
| 19 | 93.1  | 55.5 | 308 | 750   | 22 | 63 | 55 | 0.821 |
| 20 | 96.8  | 58.5 | 305 | 583   | 21 | 67 | 55 | 0.799 |
| 21 | 101.5 | 62.5 | 352 | 582   | 21 | 67 | 52 | 0.901 |
| 22 | 111.5 | 60.1 | 300 | 710   | 22 | 73 | 56 | 0.820 |
| 23 | 120.2 | 62.5 | 310 | 750   | 23 | 81 | 55 | 0.850 |
| 24 | 123.0 | 63.9 | 300 | 1,115 | 21 | 86 | 55 | 0.692 |
| 25 | 89.3  | 48.9 | 358 | 1,076 | 22 | 63 | 52 | 1.006 |
| 26 | 77.1  | 42.1 | 365 | 999   | 21 | 64 | 51 | 0.992 |
| 27 | 76.8  | 43.4 | 302 | 954   | 20 | 65 | 51 | 0.913 |
| 28 | 82.6  | 42.7 | 308 | 842   | 20 | 67 | 51 | 0.966 |
| 29 | 76.4  | 45.7 | 309 | 741   | 20 | 69 | 52 | 1.021 |
| 30 | 69.3  | 41.6 | 310 | 461   | 21 | 71 | 53 | 0.980 |
| 31 | 77.5  | 47.3 | 268 | 1,005 | 21 | 64 | 56 | 0.992 |
| 32 | 77.2  | 44.0 | 310 | 960   | 20 | 66 | 56 | 0.915 |
| 33 | 81.0  | 46.0 | 355 | 830   | 20 | 67 | 55 | 0.964 |
| 34 | 76.8  | 45.9 | 368 | 720   | 22 | 70 | 56 | 1.031 |
| 35 | 69.8  | 42.1 | 307 | 450   | 20 | 72 | 55 | 0.981 |
| 36 | 75.1  | 42.0 | 340 | 750   | 24 | 60 | 50 | 0.993 |
| 37 | 69.8  | 38.5 | 310 | 450   | 25 | 55 | 55 | 0.995 |
| 38 | 60.0  | 43.1 | 310 | 450   | 24 | 56 | 56 | 0.997 |
| 39 | 61.0  | 39.9 | 300 | 400   | 27 | 56 | 55 | 0.101 |
| 40 | 65.2  | 37.3 | 302 | 400   | 26 | 55 | 56 | 1.109 |
| 41 | 80.1  | 41.1 | 340 | 720   | 20 | 66 | 50 | 0.955 |
| 42 | 82.6  | 42.7 | 350 | 741   | 20 | 67 | 51 | 0.966 |
| 43 | 85.9  | 44.1 | 331 | 680   | 21 | 65 | 51 | 0.899 |
| 44 | 71.1  | 36.0 | 311 | 790   | 20 | 65 | 51 | 0.919 |
| 45 | 73.5  | 36.4 | 310 | 705   | 20 | 65 | 51 | 0.917 |
| 46 | 77.3  | 40.7 | 338 | 730   | 20 | 65 | 51 | 0.915 |
| 47 | 77.1  | 39.3 | 343 | 720   | 21 | 64 | 50 | 0.917 |
| 48 | 72.2  | 35.0 | 349 | 670   | 22 | 64 | 50 | 0.918 |
| 49 | 68.5  | 35.0 | 310 | 643   | 20 | 69 | 52 | 0.901 |
| 50 | 72.3  | 35.7 | 323 | 680   | 20 | 67 | 52 | 0.907 |
| 51 | 75.4  | 38.5 | 331 | 700   | 20 | 67 | 51 | 0.910 |
| 52 | 81.1  | 40.5 | 335 | 720   | 20 | 66 | 51 | 0.902 |
| 53 | 77.5  | 39.1 | 349 | 680   | 22 | 64 | 52 | 0.909 |
| 54 | 53.1  | 35.4 | 369 | 615   | 20 | 61 | 51 | 0.907 |
| 55 | 120.1 | 48.5 | 441 | 841   | 21 | 70 | 52 | 1.199 |
| 56 | 108.2 | 45.3 | 392 | 829   | 21 | 69 | 52 | 1.150 |
| 57 | 91.3  | 42.7 | 355 | 827   | 22 | 65 | 51 | 0.992 |
| 58 | 84.5  | 39.9 | 379 | 825   | 22 | 67 | 51 | 0.992 |
| 59 | 70.4  | 35.0 | 333 | 700   | 23 | 61 | 51 | 0.781 |
| 60 | 71.4  | 36.1 | 300 | 780   | 21 | 55 | 50 | 0.750 |
| 61 | 89.3  | 43.9 | 358 | 976   | 22 | 63 | 48 | 1.006 |
| 62 | 79.1  | 42.1 | 365 | 899   | 21 | 63 | 48 | 1.006 |
| 63 | 78.8  | 40.4 | 402 | 854   | 20 | 65 | 49 | 0.913 |
| 64 | 78.4  | 42.7 | 360 | 741   | 20 | 67 | 49 | 0.966 |
| 65 | 81.3  | 38.6 | 301 | 562   | 20 | 71 | 49 | 0.980 |
| Comparative Example | | | | | | | | |
| 1  | 35.2 | 18.1 | 260 | 140 | 18 | 48 | 57 | 0.964 |
| 2  | 42.6 | 22.3 | 274 | 205 | 17 | 48 | 55 | 0.982 |
| 3  | 50.6 | 27.1 | 256 | 186 | 18 | 50 | 53 | 0.990 |
| 4  | 48.9 | 23.2 | 282 | 132 | 17 | 49 | 56 | 0.966 |
| 5  | 52.3 | 24.6 | 312 | 183 | 17 | 48 | 55 | 0.968 |
| 6  | 57.1 | 25.2 | 315 | 201 | 18 | 48 | 53 | 0.970 |
| 7  | 42.3 | 22.1 | 101 | 180 | 18 | 44 | 47 | 1.031 |
| 8  | 48.1 | 26.3 | 113 | 202 | 20 | 45 | 49 | 0.999 |
| 9  | 53.1 | 31.2 | 156 | 253 | 24 | 48 | 52 | 0.979 |
| 10 | 41.6 | 21.3 | 98  | 163 | 17 | 44 | 46 | 0.104 |
| 11 | 46.2 | 24.3 | 114 | 186 | 18 | 45 | 49 | 1.000 |
| 12 | 51.3 | 26.7 | 145 | 236 | 22 | 47 | 53 | 1.031 |
| 13 | 67.2 | 31.0 | 201 | 251 | 39 | 42 | 52 | 1.028 |
| 14 | 48.7 | 21.7 | 435 | 85  | 21 | 31 | 63 | 1.105 |
| 15 | 52.4 | 20.3 | 120 | 202 | 21 | 41 | 36 | 1.029 |
| 16 | 71.3 | 36.0 | 255 | 250 | 20 | 60 | 42 | 0.987 |
| 17 | 68.8 | 32.5 | 246 | 286 | 21 | 61 | 36 | 1.102 |

TABLE 3-continued

| | TS (kg/cm²) | TRS (kg/cm) | EL (%) | AR (NBS, %) | PEI (part) | HD (shore A) | SFC (m) | DT (g/cm³) |
|---|---|---|---|---|---|---|---|---|
| 18 | 25.2 | 15.0 | 61 | 83 | 14 | 35 | 38 | 0.810 |
| 19 | 18.0 | 9.0 | 48 | 61 | 12 | 21 | 37 | 0.613 |

Notes:
[1]TS means tensile strength.
[2]TRS means tear strength.
[3]EL means elongation.
[4]AR means abrasion rate.
[5]PEI means permanent elongation.
[6]HD means hardness.
[7]SFC means static frictional coefficient.
[8]DT means density.

The results of Table 3 shows that when a modifier or compatible agent was added, or a PVC base was blended with both a suspended polymerization type and emulsified polymerization type, as in this invention, the tensile strength was increased by approx. 50 parts compared with the Comparative Examples, tear strength by 10 parts and elongation by 25 parts. In particular, for the actual application as a shoe material, the following paraters—abrasion-resistance, permanent elongation increase and static frictional coefficient—play the important roles. As far as the thermoplastic PVC foam composition manufactured in accordance with this invention is concerned, the static frictional coefficient was increased by 20 parts and abrasion-resistance by approx. 200 to 400 parts, compared with the Comparative Examples. In addition, it is noted that the permanent elongation increase was reduced by 25 parts, thus demonstrating a remarkable restoring property to the original state.

What is claimed is:

1. A thermoplastic PVC foam composition, comprising: a PVC base; one or more modifiers, present in an amount of 10 to 90 parts by weight based on 100 parts by weight of the PVC base, wherein the modifier includes a material selected from the group of a rubber, a thermoplastic urethane compound, and an ethylene-vinyl acetate copolymer; and an acrylonitrile-graft PVC material, present in an amount of 0.5 to 40 parts by weight based on 100 parts by weight of the PVC base.

2. The composition according to claim 1, wherein said PVC base comprises a mixture of a suspended PVC and an emulsified PVC, wherein the suspended/emulsified PVCs are present in a ratio of 99.5:0.5 to 0.5:99.5 parts by weight.

3. The composition according to claim 1, wherein said modifier includes a rubber selected from the group of butadiene rubber, styrene-butadiene rubber, acrylonitrile-butadiene rubber, isoprene rubber, and natural rubber.

4. The composition according to claim 1, wherein the modifier includes an ethylene-vinyl acetate copolymer having a melt flow index in the range of 0.5 to 450 g/10 minutes, and wherein a graft copolymerization rate of said vinyl acetate is in the range of 0.5 to 60 mol %.

5. The composition according to claim 3, wherein said modifier includes an acrylonitrile-butadiene rubber in a granular form, and wherein a graft copolymerization rate of said acrylonitrile is in the range of 0.5 to 40 mol %.

6. The composition according to claim 1, wherein the acrylonitrile-graft PVC material has a graft copolymerization rate of said acrylonitrile in the range of 0.5 to 45 mol %.

7. The composition according to claim 1, further including a plasticizer.

8. The composition according to claim 1, further including a stabilizer.

9. The composition according to claim 1, further including a lubricant.

10. The composition according to claim 1, further including a foaming agent.

11. The composition according to claim 1, further including a filler.

12. The composition according to claim 1, further including a coloring agent.

13. The composition according to claim 1, further including an antioxidant.

* * * * *